United States Patent
Conrad

(10) Patent No.: US 10,624,513 B2
(45) Date of Patent: Apr. 21, 2020

(54) SURFACE CLEANING APPARATUS

(71) Applicant: Omachron Intellectual Property Inc., Hampton (CA)

(72) Inventor: Wayne Ernest Conrad, Hampton (CA)

(73) Assignee: Omachron Intellectual Property Inc., Hampton, Ontario (CA)

( * ) Notice: Subject to any disclaimer, the term of this patent is extended or adjusted under 35 U.S.C. 154(b) by 0 days.

(21) Appl. No.: 16/269,081

(22) Filed: Feb. 6, 2019

(65) Prior Publication Data

US 2019/0167056 A1 Jun. 6, 2019

Related U.S. Application Data

(63) Continuation of application No. 15/452,609, filed on Mar. 7, 2017, now Pat. No. 10,244,911, which is a continuation of application No. 14/512,245, filed on Oct. 10, 2014, now Pat. No. 9,629,511, which is a continuation of application No. 13/508,970, filed as application No. PCT/CA2012/000182 on Mar. 2, 2012, now Pat. No. 8,997,309, which is a continuation-in-part of application No. 13/040,751, (Continued)

(51) Int. Cl.
| | |
|---|---|
| *B01D 45/16* | (2006.01) |
| *A47L 9/16* | (2006.01) |
| *B01D 50/00* | (2006.01) |
| *B01D 46/00* | (2006.01) |
| *B04C 5/00* | (2006.01) |
| *B04C 11/00* | (2006.01) |
| *B01D 45/12* | (2006.01) |
| *B04C 5/04* | (2006.01) |
| *B04C 5/08* | (2006.01) |
| *B04C 9/00* | (2006.01) |

(52) U.S. Cl.
CPC .......... *A47L 9/1683* (2013.01); *A47L 9/1608* (2013.01); *A47L 9/1658* (2013.01); *B01D 45/16* (2013.01); *B01D 46/00* (2013.01); *B01D 50/002* (2013.01); *B04C 5/00* (2013.01); *B04C 11/00* (2013.01); *B01D 45/12* (2013.01); *B04C 5/04* (2013.01); *B04C 5/08* (2013.01); *B04C 2009/004* (2013.01)

(58) Field of Classification Search
CPC ............................... B01D 45/12; B01D 45/16
USPC ......................... 55/459.1, 429, 433, DIG. 3
See application file for complete search history.

(56) References Cited

U.S. PATENT DOCUMENTS

| | | | |
|---|---|---|---|
| 963,139 | A | 7/1910 | Griffiths |
| 2,327,553 | A | 8/1943 | Ponselle |

(Continued)

FOREIGN PATENT DOCUMENTS

| | | |
|---|---|---|
| CA | 2659212 A1 | 9/2010 |
| DE | 112006003479 T5 | 12/2008 |

(Continued)

OTHER PUBLICATIONS

English machine translation of DE112007001314, published on Apr. 23, 2009.

(Continued)

*Primary Examiner* — Robert A Hopkins
(74) *Attorney, Agent, or Firm* — Philip C. Mendes da Costa; Bereskin & Parr LLP/S.E.N.C.R.L., s.r.l.

(57) ABSTRACT

A surface cleaning apparatus comprises a cyclone bin assembly having a sidewall surrounding a contiguous interior volume and comprising multiple segments of different profile and width.

12 Claims, 16 Drawing Sheets

Related U.S. Application Data filed on Mar. 4, 2011, now Pat. No. 9,204,772, and a continuation-in-part of application No. 13/040,955, filed on Mar. 4, 2011, now Pat. No. 9,009,912, and a continuation-in-part of application No. 13/040,731, filed on Mar. 4, 2011, now Pat. No. 8,800,104, and a continuation-in-part of application No. 13/040,711, filed on Mar. 4, 2011, now Pat. No. 8,863,352, and a continuation-in-part of application No. 13/040,768, filed on Mar. 4, 2011, now Pat. No. 8,528,164, and a continuation-in-part of application No. 13/040,934, filed on Mar. 4, 2011, now abandoned.

(56) References Cited

U.S. PATENT DOCUMENTS

| | | |
|---|---|---|
| 3,870,486 A | 3/1975 | Eriksson et al. |
| 4,179,769 A | 12/1979 | Lundquist |
| 4,185,354 A | 1/1980 | Brazier |
| 4,466,155 A | 8/1984 | Grave |
| 5,388,301 A | 2/1995 | Bosy |
| 5,412,837 A | 5/1995 | Worwag |
| 5,653,880 A | 8/1997 | Mouton |
| 5,810,558 A | 9/1998 | Streeter |
| 6,083,292 A | 7/2000 | Fumagalli |
| 6,261,330 B1 | 7/2001 | Dyson |
| 6,425,931 B1 | 7/2002 | Croggon |
| 6,440,191 B1 | 8/2002 | Berfield |
| 6,532,620 B2 | 3/2003 | Oh |
| 6,613,129 B2 | 9/2003 | Gen |
| 6,719,830 B2 | 4/2004 | Illingworth et al. |
| 6,757,935 B1 | 7/2004 | Sjoberg |
| 6,810,558 B2 | 11/2004 | Lee |
| 6,896,720 B1 | 5/2005 | Bond |
| 6,902,596 B2 | 6/2005 | Conrad et al. |
| 7,014,671 B2 | 3/2006 | Oh |
| 7,152,275 B2 | 12/2006 | Hitzelberger et al. |
| 7,175,682 B2 | 2/2007 | Nakai et al. |
| 7,186,283 B2 | 3/2007 | Vuijk |
| 7,222,392 B2 | 5/2007 | McCormick et al. |
| 7,261,754 B2 | 8/2007 | Oh et al. |
| 7,422,615 B2 | 9/2008 | Kim |
| 7,556,662 B2 | 7/2009 | Lee et al. |
| 7,594,944 B2 | 9/2009 | Oh |
| 7,628,833 B2 | 12/2009 | Oh |
| 7,632,324 B2 * | 12/2009 | Makarov ............... A47L 5/30 15/350 |
| 7,632,327 B2 | 12/2009 | Yoo |
| 7,635,400 B2 | 12/2009 | Yoo |
| 7,749,296 B2 | 7/2010 | Han et al. |
| 7,770,256 B1 | 8/2010 | Fester |
| 7,780,752 B2 | 8/2010 | Cha et al. |
| 7,785,383 B2 | 8/2010 | Oh et al. |
| 7,879,121 B2 | 2/2011 | Oh |
| 7,922,794 B2 | 4/2011 | Morphey |
| 8,375,509 B2 | 2/2013 | Bates et al. |
| 2002/0073663 A1 | 6/2002 | Sepke et al. |
| 2002/0137059 A1 | 9/2002 | Wu et al. |
| 2003/0106182 A1 | 6/2003 | Lee |
| 2004/0177472 A1 | 9/2004 | Go et al. |
| 2005/0160554 A1 | 7/2005 | Ueyama et al. |
| 2006/0016044 A1 | 1/2006 | Wiedemann |
| 2006/0080947 A1 | 4/2006 | Lee et al. |
| 2006/0230724 A1 | 10/2006 | Han et al. |
| 2007/0011998 A1 | 1/2007 | Yoo et al. |
| 2007/0012003 A1 | 1/2007 | Oh et al. |
| 2007/0067944 A1 | 3/2007 | Kitamura et al. |
| 2007/0079580 A1 | 4/2007 | Oh |
| 2007/0079584 A1 | 4/2007 | Kim et al. |
| 2007/0079585 A1 | 4/2007 | Oh et al. |
| 2007/0163072 A1 | 7/2007 | Sepke et al. |
| 2007/0214754 A1 | 9/2007 | Kim |
| 2008/0040883 A1 | 2/2008 | Beskow et al. |
| 2008/0134460 A1 | 6/2008 | Conrad |
| 2008/0178416 A1 | 7/2008 | Conrad |
| 2008/0223010 A1 | 9/2008 | Han et al. |
| 2009/0133370 A1 | 5/2009 | Yoo et al. |
| 2009/0158932 A1 | 6/2009 | Arnold |
| 2009/0165431 A1 | 7/2009 | Oh |
| 2009/0205160 A1 | 8/2009 | Conrad |
| 2009/0205161 A1 | 8/2009 | Conrad |
| 2009/0300874 A1 | 12/2009 | Tran et al. |
| 2010/0175217 A1 | 7/2010 | Conrad |
| 2010/0212104 A1 | 8/2010 | Conrad |
| 2010/0242210 A1 | 9/2010 | Conrad |
| 2010/0243158 A1 | 9/2010 | Conrad |
| 2010/0299865 A1 | 12/2010 | Conrad |
| 2010/0299866 A1 | 12/2010 | Conrad |
| 2011/0146024 A1 | 6/2011 | Conrad |
| 2011/0219574 A1 | 9/2011 | Conrad |
| 2013/0227813 A1 | 9/2013 | Conrad |

FOREIGN PATENT DOCUMENTS

| | | |
|---|---|---|
| DE | 112007001314 T5 | 4/2009 |
| EP | 836827 A1 | 11/2000 |
| EP | 0836827 B1 | 11/2000 |
| EP | 885585 | 4/2002 |
| EP | 1602308 A1 | 12/2005 |
| EP | 1938733 A1 | 7/2008 |
| EP | 1952743 B1 | 11/2011 |
| GB | 2319738 A | 6/1998 |
| JP | 2012011253 A | 1/2012 |
| WO | 96/19294 A1 | 6/1996 |
| WO | 2004008932 A1 | 1/2004 |
| WO | 2008070965 A1 | 6/2008 |
| WO | 2009026709 A1 | 3/2009 |
| WO | 2010102396 A1 | 9/2010 |

OTHER PUBLICATIONS

English machine translation of DE112006003479, published on Dec. 18, 2008.
Definition of diameter in Oxford Dictionary, 2016.
International Search Report received in connection to international patent application No. PCT/CA2012/000182, dated May 25, 2012.
International Preliminary Report on Patentability received in connection to international patent application No. PCT/CA2012/000182, dated Sep. 10, 2013.
English machine translation of the Abstract of JP2012011253, published on Jan. 19, 2012.
English machine translation of the Abstract of WO 96/19294, published on Jun. 27, 1996.

* cited by examiner

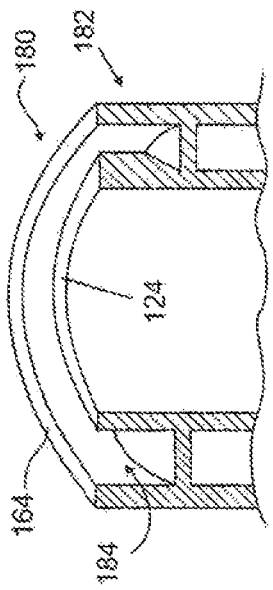
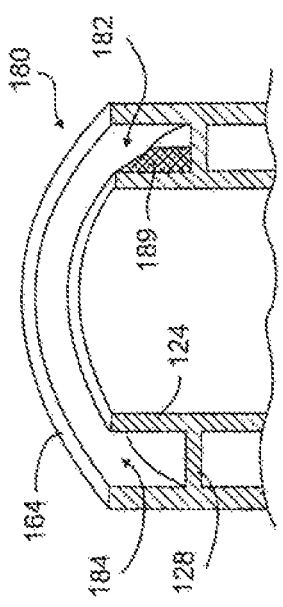
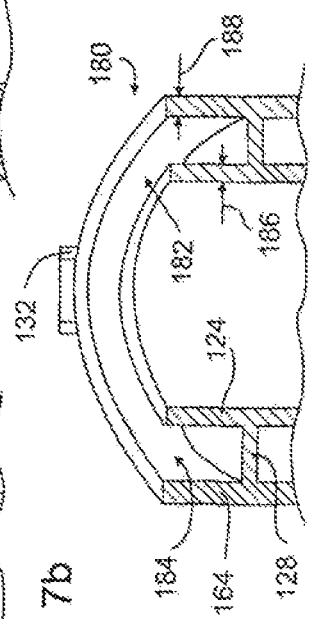
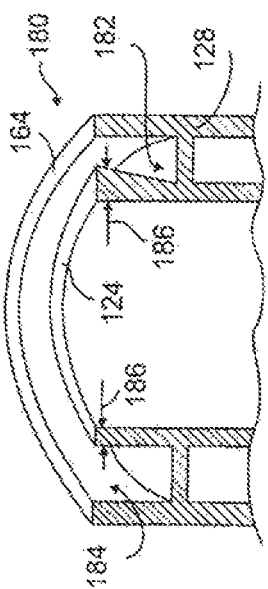
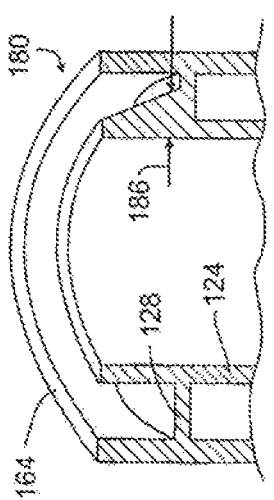

SURFACE CLEANING APPARATUS

CROSS REFERENCE TO RELATED APPLICATIONS

This application is a continuation of U.S. patent application Ser. No. 15/452,609, filed on Mar. 7, 2017, now allowed, which itself is a continuation of Ser. No. 14/512,245, filed on Oct. 10, 2014, now U.S. Pat. No. 9,629,511 as of Apr. 25, 2017, which itself is a continuation of U.S. patent application Ser. No. 13/508,970, filed on May 9, 2012, now issued U.S. Pat. No. 8,997,309 as of Apr. 7, 2015, which is a national phase entry of application PCT/CA2012/000182 filed on Mar. 2, 2012, wherein application PCT/CA2012/000182 is a continuation-in-part of co-pending U.S. patent application Ser. No. 13/040,751, filed Mar. 4, 2011, now issued U.S. Pat. No. 9,204,772 as of Dec. 8, 2015; and is a continuation-in-part of U.S. patent application Ser. No. 13/040,955 filed Mar. 4, 2011, now issued U.S. Pat. No. 9,009,912 as of Apr. 21, 2015; and is a continuation-in-part of U.S. patent application Ser. No. 13/040,731, filed Mar. 4, 2011, now issued U.S. Pat. No. 8,800,104 as of Aug. 12, 2014; and is a continuation-in-part of U.S. patent application Ser. No. 13/040,711, filed Mar. 4, 2011, now issued U.S. Pat. No. 8,863,352 as of Oct. 21, 2014; and is a continuation-in-part of Ser. No. 13/040,768 filed Mar. 4, 2011, now issued U.S. Pat. No. 8,528,164 as of Sep. 10, 2013; and is a continuation in part of U.S. patent application Ser. No. 13/040,934, filed on Mar. 4, 2011, now abandoned, each of those applications being incorporated herein in their entirety by reference

FIELD

The disclosure relates to surface cleaning apparatuses, such as vacuum cleaners.

INTRODUCTION

Various constructions for surface cleaning apparatuses, such as vacuum cleaners, are known. Currently, many surface cleaning apparatuses are constructed using at least one cyclonic cleaning stage. Air is drawn into the vacuum cleaners through a dirty air inlet and conveyed to a cyclone inlet. The rotation of the air in the cyclone results in some of the particulate matter in the airflow stream being disentrained from the airflow stream. This material is then collected in a dirt bin collection chamber, which may be at the bottom of the cyclone or in a direct collection chamber exterior to the cyclone chamber (see for example WO2009/026709 and U.S. Pat. No. 5,078,761). One or more additional cyclonic cleaning stages and/or filters may be positioned downstream from the cyclone.

SUMMARY

The following summary is provided to introduce the reader to the more detailed discussion to follow. The summary is not intended to limit or define the claims.

According to one broad aspect of the teachings described herein, a dirt collection chamber for one or more cyclone chambers extends from a dirt inlet towards a dirt collection area. For example, the dirt inlet may be in an upper portion of the dirt collection chamber and the dirt collection area may be the floor of the dirt collection chamber. The dirt collection chamber comprises a sidewall (preferably an outer sidewall) that extends longitudinally between opposing first and second ends of the dirt collection chamber. Air circulating within the dirt collection chamber may flow along the sidewall. For example, air may exit the dirt outlet of the cyclone chamber and rotate around the dirt collection chamber and travel towards the dirt collection area. The air will at some point travel in the reverse direction towards the dirt inlet and re-enter the cyclone chamber. The dirt collection chamber may be configured such that the cross sectional area of the dirt collection chamber in a plane transverse to its length changes at least once along the length of the dirt collection chamber. In some embodiments, the cross-sectional area at the first end of the dirt collection chamber is different than the cross-sectional area at the second end of the dirt collection chamber.

An advantage of this configuration may be that changes in the cross-sectional area may be used to enhance the separation efficiency of the cyclone chamber and associated dirt collection chamber. By varying the transverse cross sectional area of the dirt collection chamber, the flow dynamics of the air in the dirt collection chamber may be varied and the amount of dirt that is disentrained from the air may be decreased, or the amount of dirt that is re-entrained may be reduced. For example, if the cross sectional area of the portion of the dirt collection chamber distal to the dirt inlet (e.g., the lower portion) is less than the opposed portion (e.g. upper portion) adjacent the dirt inlet, then the air will slow down as it enters the upper portion. As the velocity decreases, the amount of dirt that may be re-entrained in the return airflow may decrease. If the cross sectional area of the portion of the dirt collection chamber distal to the dirt inlet (e.g., the lower portion) is greater than the opposed portion (e.g. upper portion) adjacent the dirt inlet, then the air will slow down as it enters the lower portion allowing more dirt to be disentrained.

The cyclone chamber and dirt collection chamber assembly may be used in any surface cleaning apparatus. The surface cleaning apparatus comprises an air flow passage extending from a dirty air inlet to a clean air outlet. A suction motor is provided in the air flow passage, and a cyclone bin assembly is provided in the air flow passage, preferably upstream from the suction motor. The cyclone bin assembly may comprise the cyclone chamber and a dirt collection chamber. Dirty air from the dirty air inlet may circulate within the cyclone chamber and may exit the cyclone chamber to circulate within the dirt collection chamber.

The cyclone bin assembly may also comprise a fine particle separator, to help separate relatively fine dirt particles from the dirty air. The fine particle separator comprises a flow chamber through which the dirty air may circulate. Dirty air, carrying entrained fine dirt particles may flow from the cyclone chamber into the fine particle separator. Air exiting the fine particle separator may re-enter the cyclone chamber, and travel to the suction motor via a cyclone air outlet.

The fine particle separator is configured so that air circulating in the flow chamber may travel at a relatively high velocity, and may travel faster than the air circulating within the cyclone chamber. To help increase the air flow velocity the cross-sectional area of the flow chamber, in the flow direction, may be varied, and preferably is reduced. Accelerating the dirty air to a relatively higher velocity may help disentrain fine dirt particles.

The air outlet of the fine particle separator flow chamber may be configured to disrupt the flow of air exiting the flow chamber. Disrupting the flow of air, for example by introducing eddy currents and/or turbulence and/or directing the air away from the cyclone dirt outlet, may help separate fine dirt particles from the air stream. Separated dirt particles may fall into the dirt collection chamber.

An advantage of this configuration may be a more efficient separation of fine dirt particles from the dirty air stream. Separating fine dirt particles from the dirty air stream in the fine particle separator may help prevent the fine dirt particles from continuing downstream from the cyclone bin assembly, and, for example, fouling the suction motor and/or a pre-motor filter.

In accordance with this aspect a surface cleaning apparatus comprises an air flow passage extending from a dirty air inlet to a clean air outlet. The air flow passage includes a suction motor. The surface cleaning apparatus may also comprise a cyclone chamber provided in the air flow passage. The cyclone chamber may comprise a cyclone air inlet, a cyclone air outlet and a dirt outlet. The surface cleaning apparatus may comprise a dirt collection chamber having a dirt inlet, a dirt collection chamber first end, an opposed dirt collection chamber second end and a longitudinally extending sidewall. The sidewall may comprise a portion that has a longitudinal length and extends away from the dirt inlet towards the opposed dirt collection chamber second end. A transverse cross sectional area of the dirt collection chamber may vary at least once along the length of the portion of the sidewall.

The dirt inlet may be positioned adjacent the dirt collection chamber first end.

A dirt collection area may be provided at the opposed dirt collection chamber second end.

The dirt collection chamber first end may be an upper end. The dirt inlet may be provided at the upper end, and a dirt collection area may be provided in a lower portion of the dirt collection chamber.

The dirt collection chamber may be exterior to the cyclone chamber.

The dirt collection chamber may surround at least a portion of the cyclone chamber.

The dirt collection chamber may surround the cyclone chamber.

The cyclone chamber and the dirt collection chamber may be provided in a cyclone bin assembly. The cyclone bin assembly may be removably mounted to the surface cleaning apparatus.

The portion of the sidewall may include at least one discontinuity.

The portion of the sidewall may extend inwardly at a position along its length whereby the transverse cross sectional area may be reduced.

The portion of the sidewall may extend inwardly at a position along its length whereby the transverse cross sectional area may be increased.

The dirt collection chamber may surround at least a portion of the cyclone chamber. The dirt collection chamber may have an inner side adjacent the cyclone chamber and an outer side spaced from the cyclone chamber. The portion of the sidewall may be provided at the outer side.

The portion of the sidewall may include at least one discontinuity.

The portion of the sidewall may extend inwardly at a position along its length whereby the transverse cross sectional area may be reduced.

The portion of the sidewall may extend inwardly at a position along its length whereby the transverse cross sectional area may be increased.

The cyclone air inlet may be at a first end of the cyclone chamber. The dirt outlet may be provided at a second opposed end of the cyclone chamber.

The dirt inlet may be at an upper end of the cyclone chamber.

The surface cleaning apparatus may comprise a rib extending between the inner side and the outer side. The rib may be provided along the portion of the sidewall.

The rib may extend only part way along the portion of the sidewall.

According to another broad aspect of the teachings described herein, a surface cleaning apparatus comprises a cyclone chamber and a fine particle separator in flow communication with the cyclone chamber via the cyclone chamber dirt outlet. The fine particle separator helps to separate relatively fine dirt particles from the dirty air. The fine particle separator comprises a flow chamber through which the dirty air may circulate. Dirty air, carrying entrained fine dirt particles may flow from the cyclone chamber into the fine particle separator. Air exiting the fine particle separator may re-enter the cyclone chamber, and travel to the suction motor via a cyclone air outlet.

The fine particle separator is configured so that air circulating in the flow chamber may travel at a relatively high velocity, and may travel faster than the air circulating within the cyclone chamber to thereby separate finer dirt particles than those separated in the cyclone chamber. To help increase the air flow velocity, the cross-sectional area of the flow chamber, in the flow direction, may be varied, and preferably is reduced. Accelerating the dirty air to a relatively higher velocity may help disentrain fine dirt particles.

The air outlet of the fine particle separator flow chamber may be configured to disrupt the flow of air exiting the flow chamber. Disrupting the flow of air, for example by introducing eddy currents and/or turbulence and/or directing the air away from the cyclone dirt outlet, may help separate fine dirt particles from the air stream. Separated dirt particles may fall into the dirt collection chamber.

An advantage of this configuration may be a more efficient separation of fine dirt particles from the dirty air stream. Separating fine dirt particles from the dirty air stream in the fine particle separator may help prevent the fine dirt particles from continuing downstream from the cyclone bin assembly, and, for example, fouling the suction motor and/or a pre-motor filter.

The cyclone air outlet may be in communication with an exit duct conduit (which may be a down duct depending upon the orientation of the duct conduit) extending away from the cyclone air outlet and preferably through (e.g., linearly through) a dirt collection chamber having a wall (e.g., a floor) facing the end of the cyclone chamber with the air outlet. For example, the down duct may extend from the floor of the cyclone chamber to the floor of the dirt collection chamber. Reinforcing ribs may extend between the down duct and the floor of the cyclone chamber. The ribs may help reduce vibrations in the down duct and/or the floor of the dirt collection chamber, including, for example, vibrations induced by air flowing through the down duct. Optionally, the down duct and/or the support ribs may be removable.

An advantage of this configuration may be that vibration of the down duct and/or the floor of the dirt collection chamber may be reduced. Reducing the vibration of the down duct and/or the floor of the dirt collection chamber may help reduce the overall amount of noise generated by the surface cleaning apparatus and/or improve the separation efficiency of the cyclone chamber and the dirt collection chamber.

The dirt collection chamber may extend from a dirt inlet towards a dirt collection area. For example, the dirt inlet may be in an upper portion of the dirt collection chamber and the dirt collection area may be the floor of the dirt collection chamber. The dirt collection chamber comprises a sidewall (preferably an outer sidewall) that extends longitudinally between opposing first and second ends of the dirt collection chamber. Air circulating within the dirt collection chamber may flow along the sidewall. For example, air may exit the dirt outlet of the cyclone chamber and rotate around the dirt collection chamber and travel towards the dirt collection area. The air will at some point travel in the reverse direction towards the dirt inlet and re-enter the cyclone chamber. The dirt collection chamber may be configured such that the cross sectional area of the dirt collection chamber in a plane transverse to its length changes at least once along the length of the dirt collection chamber. In some embodiments, the cross-sectional area at the first end of the dirt collection chamber is different than the cross-sectional area at the second end of the dirt collection chamber.

An advantage of this configuration may be that changes in the cross-sectional area may be used to enhance the separation efficiency of the cyclone chamber and associated dirt collection chamber. By varying the transverse cross sectional area of the dirt collection chamber, the flow dynamics of the air in the dirt collection chamber may be varied and the amount of dirt that is disentrained from the air may be decreased, or the amount of dirt that is re-entrained may be reduced. For example, if the cross sectional area of the portion of the dirt collection chamber distal to the dirt inlet (e.g., the lower portion) is less than the opposed portion (e.g. upper portion) adjacent the dirt inlet, then the air will slow down as it enters the upper portion. As the velocity decreases, the amount of dirt that may be re-entrained in the return airflow may decrease. If the cross sectional area of the portion of the dirt collection chamber distal to the dirt inlet (e.g., the lower portion) is greater than the opposed portion (e.g. upper portion) adjacent the dirt inlet, then the air will slow down as it enters the lower portion allowing more dirt to be disentrained.

The cyclone chamber and dirt collection chamber assembly may be used in any surface cleaning apparatus. The surface cleaning apparatus comprises an air flow passage extending from a dirty air inlet to a clean air outlet. A suction motor is provided in the air flow passage, and a cyclone bin assembly is provided in the air flow passage, preferably upstream from the suction motor. The cyclone bin assembly may comprise a cyclone chamber and a dirt collection chamber. Dirty air from the dirty air inlet may circulate within the cyclone chamber and may exit the cyclone chamber to circulate within the dirt collection chamber.

In accordance with this aspect, a surface cleaning apparatus comprises an air flow passage extending from a dirty air inlet to a clean air outlet. The air flow passage includes a suction motor. The surface cleaning apparatus may also comprise a cyclone chamber provided in the air flow passage. The cyclone chamber may comprise a cyclone air inlet, a cyclone air outlet, a dirt outlet and a cyclone chamber wall. The surface cleaning apparatus may also comprise a fine particle separator. The fine particle separator may comprise an annular flow channel, a fine particle separator inlet in communication with the cyclone chamber via the cyclone dirt outlet, a fine particle separator dirt outlet and a fine particle separator sidewall. The surface cleaning apparatus may also comprise a dirt collection chamber in communication with the fine particle separator dirt outlet. The dirt collection chamber may comprise a dirt collection chamber sidewall.

The fine particle separator may surround at least a portion of the cyclone chamber.

The fine particle separator inlet may comprise an inlet for air and fine particles to enter the fine particle separator and an outlet for air to re-enter the cyclone chamber.

The fine particle separator inlet may be the sole communication between the cyclone chamber and the fine particle separator.

The cyclone dirt outlet may comprise a slot that extends part way around the cyclone chamber wall.

The slot may be provided adjacent a first end of the cyclone chamber. The cyclone air inlet may be provided at a second opposed end of the cyclone chamber.

The cyclone chamber air outlet may be provided at the second opposed end of the cyclone chamber.

The first end of the cyclone chamber may be an upper end of the cyclone chamber.

The fine particle separator may be positioned above the dirt collection chamber.

The annular flow channel may have an axis of rotation and a cross sectional area in a plane parallel to the axis of rotation.

The cross sectional area may vary at at least one location in the annular flow channel.

The cross sectional area may decrease in a downstream direction.

The cross sectional area may decrease in a downstream portion of the annular flow channel towards the fine particle separator inlet.

A width and/or a height of the annular flow channel may be varied to vary the cross sectional area.

A downstream portion of the annular flow channel adjacent the fine particle separator inlet may be configured to be spaced further radially outwardly from the fine particle separator inlet than a portion of the annular flow channel upstream thereof.

The fine particle separator may have an inner wall. The inner wall may comprise a ramp section adjacent the fine particle separator inlet which extends radially outwardly and in a direction of rotation.

The fine particle separator may extend between the fine particle separator sidewall and the cyclone chamber wall.

The fine particle separator may comprise an annular flow channel having a closed end and an opposed open end that may comprise the fine particle separator dirt outlet. The dirt collection chamber may extend away from the fine particle separator dirt outlet.

The fine particle separator may comprise an annular flow channel having an upper end and an open lower end that may comprise the fine particle separator dirt outlet and the dirt collection chamber extends away from the fine particle separator dirt outlet and surrounds at least a portion of the cyclone chamber.

The dirt collection chamber may comprise an annular region extending around the cyclone chamber.

The surface cleaning apparatus may comprise a rib provided in the dirt collection chamber. The rib may extend between the dirt collection chamber sidewall and a radially inner wall of the dirt collection chamber.

The rib may extend only part way along the radially inner wall.

The dirt collection chamber sidewall may comprise an extension of the fine particle separator sidewall and the radially inner wall may comprise a portion of the cyclone chamber wall.

The dirt collection chamber sidewall may comprise an extension of the fine particle separator sidewall.

The dirt collection chamber sidewall may comprise a discontinuity along its length.

According to another broad aspect of the teachings described herein, a dirt collection chamber for one or more cyclone chambers extends from a dirt inlet towards a dirt collection area. For example, the dirt inlet may be in an upper portion of the dirt collection chamber and the dirt collection area may be the floor of the dirt collection chamber. The dirt collection chamber comprises an annular flow region with a transverse rib or baffle extending part way and, preferably, the entire width of the dirt collection chamber between the inner and outer sidewalls of the annular flow region (e.g., the rib may extend between an outer surface of the cyclone chamber and an opposing inner surface of the surrounding dirt collection chamber). A portion of the dirty air circulating within the cyclone chamber may exit the cyclone chamber via the dirt outlet and circulate within the surrounding dirt collection chamber. Preferably, the rib is adjacent the dirt outlet of the cyclone chamber. More preferably, the rib is positioned between the dirt outlet and a discontinuity in the dirt collection chamber sidewall. The rib may extend part way along the length of the annular dirt collection region.

An advantage of this configuration may be that dirty air circulating within the dirt collection chamber may be disrupted by the rib, which may help disentrain dirt particles from the dirty air stream. Another advantage of this design is that rotational flow of air in the dirt collection chamber may be reduced or stopped thereby reducing the re-entrainment of separated particulate material.

The dirt collection chamber may comprise a sidewall (preferably an outer sidewall) that extends longitudinally between opposing first and second ends of the dirt collection chamber. Air that may be circulating within the dirt collection chamber may flow along the sidewall. For example, air may exit the dirt outlet of the cyclone chamber and rotate around the dirt collection chamber and travel towards the dirt collection area. The air will at some point travel in the reverse direction towards the dirt inlet and re-enter the cyclone chamber. The dirt collection chamber may be configured such that the cross sectional area of the dirt collection chamber in a plane transverse to its length changes at least once along the length of the dirt collection chamber. In some embodiments, the cross-sectional area at the first end of the dirt collection chamber is different than the cross-sectional area at the second end of the dirt collection chamber.

An advantage of this configuration may be that changes in the cross-sectional area may be used to enhance the separation efficiency of the cyclone chamber and associated dirt collection chamber. By varying the transverse cross sectional area of the dirt collection chamber, the flow dynamics of the air in the dirt collection chamber may be varied and the amount of dirt that is disentrained from the air may be decreased, or the amount of dirt that is re-entrained may be reduced. For example, if the cross sectional area of the portion of the dirt collection chamber distal to the dirt inlet (e.g., the lower portion) is less than the opposed portion (e.g. upper portion) adjacent the dirt inlet, then the air will slow down as it enters the upper portion. As the velocity decreases, the amount of dirt that may be re-entrained in the return airflow may decrease. If the cross sectional area of the portion of the dirt collection chamber distal to the dirt inlet (e.g., the lower portion) is greater than the opposed portion (e.g. upper portion) adjacent the dirt inlet, then the air will slow down as it enters the lower portion allowing more dirt to be disentrained.

The cyclone chamber and dirt collection chamber assembly may be used in any surface cleaning apparatus. The surface cleaning apparatus comprises an air flow passage extending from a dirty air inlet to a clean air outlet. A suction motor is provided in the air flow passage, and a cyclone bin assembly is provided in the air flow passage, preferably upstream from the suction motor. The cyclone bin assembly may comprise the cyclone chamber and a dirt collection chamber. Dirty air from the dirty air inlet may circulate within the cyclone chamber and may exit the cyclone chamber to circulate within the dirt collection chamber.

The cyclone bin assembly may also comprise a fine particle separator, to help separate relatively fine dirt particles from the dirty air. The fine particle separator may comprise a flow chamber through which the dirty air may circulate. Dirty air, carrying entrained fine dirt particles may flow from the cyclone chamber into the fine particle separator. Air exiting the fine particle separator may re-enter the cyclone chamber, and travel to the suction motor via a cyclone air outlet.

The fine particle separator may be configured so that air circulating in the flow chamber may travel at a relatively high velocity, and may travel faster than the air circulating within the cyclone chamber. To help increase the air flow velocity, the cross-sectional area of the flow chamber, in the flow direction, may be varied, and preferably is reduced. Accelerating the dirty air to a relatively higher velocity may help disentrain fine dirt particles.

The air outlet of the fine particle separator flow chamber may be configured to disrupt the flow of air exiting the flow chamber. Disrupting the flow of air, for example by introducing eddy currents and/or turbulence and/or directing the air away from the cyclone dirt outlet, may help separate fine dirt particles from the air stream. Separated dirt particles may fall into the dirt collection chamber.

An advantage of this configuration may be a more efficient separation of fine dirt particles from the dirty air stream. Separating fine dirt particles from the dirty air stream in the fine particle separator may help prevent the fine dirt particles from continuing downstream from the cyclone bin assembly, and, for example, fouling the suction motor and/or a pre-motor filter.

In accordance with this aspect, a surface cleaning apparatus may comprise an air flow passage extending from a dirty air inlet to a clean air outlet. The air flow passage includes a suction motor. The surface cleaning apparatus may also comprise a cyclone chamber in the air flow passage. The cyclone chamber may comprise a cyclone air inlet, a cyclone air outlet, a cyclone dirt outlet and a cyclone chamber wall. The surface cleaning apparatus may also comprise a dirt collection chamber having a dirt inlet in communication with the cyclone dirt outlet. At least a portion of the cyclone chamber may be in the dirt collection chamber. The dirt collection chamber may comprise an inner side adjacent the cyclone chamber and an outer side spaced from the cyclone chamber and defined by a dirt collection chamber sidewall. A rib may extend between the inner side and the outer side.

The rib extends only part way along the inner side.

The dirt collection chamber may have a first end and a second opposed end. The dirt inlet may be provided at the first end and the rib may be spaced from the dirt inlet towards the second opposed end.

The dirt inlet may be positioned adjacent a first end of the dirt collection chamber.

The dirt collection chamber may comprise a dirt collection area that is provided at a second end opposed to the first end.

The dirt inlet may be at an upper end of the dirt collection chamber and the dirt collection area may be in a lower portion of the dirt collection chamber.

The dirt collection chamber may surround the cyclone chamber.

The dirt collection chamber may extend part way around the cyclone chamber to define a sector. The rib may be provided at a location spaced from each end of the sector.

The cyclone chamber and the dirt collection chamber may be provided in a cyclone bin assembly. The cyclone bin assembly may be removably mounted to the surface cleaning apparatus.

The dirt collection chamber sidewall may include at least one discontinuity.

The dirt collection chamber may have a first end and a second opposed end. The dirt inlet may be provided at the first end and the rib may be spaced from the dirt inlet towards the second opposed end.

The rib may be provided between the cyclone dirt outlet and the discontinuity.

A portion of the dirt collection chamber sidewall may extend inwardly at a position along its length.

A portion of the dirt collection chamber sidewall may extend outwardly at a position along its length The cyclone dirt outlet may comprise a slot that extends part way around the cyclone chamber wall.

The slot may be provided adjacent a first end of the cyclone chamber and the cyclone air inlet may be provided at a second opposed end of the cyclone chamber.

The cyclone chamber air outlet may be provided at the second opposed end of the cyclone chamber.

The first end of the cyclone chamber may be an upper end of the cyclone chamber.

The surface cleaning apparatus may comprise an annular flow chamber exterior to the cyclone chamber. The annular flow chamber may have a first end and a second end spaced from the first end and in communication with the dirt collection chamber.

The annular flow chamber may comprise a volume contiguous with the dirt collection chamber and located between the first end of the annular flow chamber and the rib.

The rib may have an end facing the first end. The end may be spaced from the first end of the annular flow chamber.

The cyclone dirt outlet may be the dirt collection chamber dirt inlet.

According to yet another broad aspect of the teachings described herein, a cyclone bin assembly comprises a cyclone chamber and a dirt collection chamber. The cyclone air outlet is in communication with an exit duct conduit (which may be a down duct depending upon the orientation of the duct conduit) extending away from the cyclone air outlet and preferably through (e.g., linearly through) a dirt collection chamber having a wall (e.g., a floor) facing the end of the cyclone chamber with the air outlet. The down duct may extend from the floor of the cyclone chamber to the floor of the dirt collection chamber. Reinforcing ribs may be provided and may extend between the down duct and the floor of the cyclone chamber. The ribs may help reduce vibrations in the down duct and/or the floor of the dirt collection chamber, including, for example, vibrations induced by air flowing through the down duct. Optionally, the down duct and/or the support ribs may be removable.

An advantage of this configuration may be that vibration of the down duct and/or the floor of the dirt collection chamber may be reduced. Reducing the vibration of the down duct and/or the floor of the dirt collection chamber may help reduce the overall amount of noise generated by the surface cleaning apparatus and/or improve the separation efficiency of the cyclone chamber and the dirt collection chamber.

The dirt collection chamber may extend from a dirt inlet towards a dirt collection area. For example, the dirt inlet may be in an upper portion of the dirt collection chamber and the dirt collection area may be the floor of the dirt collection chamber. The dirt collection chamber comprises a sidewall (preferably an outer sidewall) that extends longitudinally between opposing first and second ends of the dirt collection chamber. Air circulating within the dirt collection chamber may flow along the sidewall. For example, air may exit the dirt outlet of the cyclone chamber and rotate around the dirt collection chamber and travel towards the dirt collection area. The air will at some point travel in the reverse direction towards the dirt inlet and re-enter the cyclone chamber. The dirt collection chamber may be configured such that the cross sectional area of the dirt collection chamber in a plane transverse to its length changes at least once along the length of the dirt collection chamber. In some embodiments, the cross-sectional area at the first end of the dirt collection chamber is different than the cross-sectional area at the second end of the dirt collection chamber.

An advantage of this configuration may be that changes in the cross-sectional area may be used to enhance the separation efficiency of the cyclone chamber and associated dirt collection chamber. By varying the transverse cross sectional area of the dirt collection chamber, the flow dynamics of the air in the dirt collection chamber may be varied and the amount of dirt that is disentrained from the air may be decreased, or the amount of dirt that is re-entrained may be reduced. For example, if the cross sectional area of the portion of the dirt collection chamber distal to the dirt inlet (e.g., the lower portion) is less than the opposed portion (e.g. upper portion) adjacent the dirt inlet, then the air will slow down as it enters the upper portion. As the velocity decreases, the amount of dirt that may be re-entrained in the return airflow may decrease. If the cross sectional area of the portion of the dirt collection chamber distal to the dirt inlet (e.g., the lower portion) is greater than the opposed portion (e.g. upper portion) adjacent the dirt inlet, then the air will slow down as it enters the lower portion allowing more dirt to be disentrained.

The cyclone chamber and dirt collection chamber assembly may be used in any surface cleaning apparatus. The surface cleaning apparatus comprises an air flow passage extending from a dirty air inlet to a clean air outlet. A suction motor is provided in the air flow passage, and a cyclone bin assembly is provided in the air flow passage, preferably upstream from the suction motor. The cyclone bin assembly may comprise the cyclone chamber and a dirt collection chamber. Dirty air from the dirty air inlet may circulate within the cyclone chamber and may exit the cyclone chamber to circulate within the dirt collection chamber.

The cyclone bin assembly may also comprise a fine particle separator, to help separate relatively fine dirt particles from the dirty air. The fine particle separator may comprise a flow chamber through which the dirty air may circulate. Dirty air, carrying entrained fine dirt particles may flow from the cyclone chamber into the fine particle separator. Air exiting the fine particle separator may re-enter the cyclone chamber, and travel to the suction motor via a cyclone air outlet.

The fine particle separator is configured so that air circulating in the flow chamber may travel at a relatively high velocity, and may travel faster than the air circulating within the cyclone chamber. To help increase the air flow velocity the cross-sectional area of the flow chamber, in the flow direction, may be varied, and preferably is reduced. Accelerating the dirty air to a relatively higher velocity may help disentrain fine dirt particles.

The air outlet of the fine particle separator flow chamber may be configured to disrupt the flow of air exiting the flow chamber. Disrupting the flow of air, for example by introducing eddy currents and/or turbulence and/or directing the air away from the cyclone dirt outlet, may help separate fine dirt particles from the air stream. Separated dirt particles may fall into the dirt collection chamber.

An advantage of this configuration may be a more efficient separation of fine dirt particles from the dirty air stream. Separating fine dirt particles from the dirty air stream in the fine particle separator may help prevent the fine dirt particles from continuing downstream from the cyclone bin assembly, and, for example, fouling the suction motor and/or a pre-motor filter.

In accordance with this aspect, a surface cleaning apparatus may comprise an air flow passage extending from a dirty air inlet to a clean air outlet and a suction motor. The surface cleaning apparatus may comprise a cyclone chamber provided in the air flow passage. The cyclone chamber may comprise a cyclone chamber first end and a cyclone chamber second opposed end, a cyclone air inlet, a cyclone air outlet provided at the cyclone chamber second opposed end and a cyclone chamber wall. An air exit conduit may be exterior to the cyclone chamber and may extend from the cyclone air outlet. At least one reinforcing rib may be positioned in abutting relationship with the air exit conduit and the cyclone chamber second opposed end.

The reinforcing rib may be connected to the air exit conduit.

The reinforcing rib may be connected to the cyclone chamber second opposed end.

The air exit conduit may extend through a dirt collection chamber that may be positioned exterior to the cyclone chamber.

The air exit conduit may be removably mounted to the cyclone chamber.

The cyclone chamber may comprise a vortex finder and the vortex finder remains in position when the air exit conduit is removed.

The cyclone air inlet may be located adjacent the cyclone chamber second opposed end.

The cyclone chamber may comprise a cyclone dirt outlet located adjacent the cyclone chamber first end. The surface cleaning apparatus may comprise a dirt collection chamber in communication with the cyclone dirt outlet.

The dirt collection chamber may extend at least part way around the cyclone chamber. The dirt collection chamber may have a dirt collection chamber first end and a dirt collection chamber second opposed end that may be spaced from and may face the cyclone chamber second opposed end. The air exit conduit may extend between the cyclone chamber second opposed end and the dirt collection chamber second opposed end.

The surface cleaning apparatus may comprise a cyclone bin assembly that is removably mounted to the surface cleaning apparatus, the cyclone bin assembly comprising the cyclone chamber and a dirt collection chamber.

The air exit conduit may extend through the dirt collection chamber.

The cyclone air outlet may be provided in the cyclone chamber second opposed end. The dirt collection chamber may have a dirt collection chamber end that is spaced from and faces the cyclone chamber second opposed end. The air exit conduit may extend between the cyclone chamber second opposed end and the dirt collection chamber end.

The dirt collection chamber end may be openable.

The dirt collection chamber end may have an air exit port in communication with the air exit conduit and the air exit conduit remains in position when the dirt collection chamber end is opened.

The air exit conduit may be removably mounted to the cyclone chamber.

The cyclone chamber may comprise a vortex finder and the vortex finder may remain in position when the air exit conduit is removed.

The cyclone air inlet may be located adjacent the cyclone chamber second opposed end.

The cyclone chamber may comprise a cyclone dirt outlet located adjacent the cyclone chamber first end. The surface cleaning apparatus may comprise a dirt collection chamber in communication with the cyclone dirt outlet.

According to yet another broad aspect of the teachings described herein, a dirt collection chamber is provided with one or more recessed areas on the outer sidewall of the dirt collection chamber. The dirt collection chamber is separate from (e.g., exterior to) the cyclone chamber. Preferably, the recess is a longitudinally extending recess. The recess may extend from the floor of the dirt collection chamber to the floor of the cyclone chamber, and may extend past the floor of the cyclone chamber. The recess provides a discontinuity on the inner surface of the dirt collection chamber sidewall. The discontinuity may disrupt the flow of the dirty air flowing along the inner surface of the sidewall, which may help disentrain dirt particles from the dirty airflow. The ejected dirt particles may collect within the recess, and may fall to the floor of the dirt collection chamber if the recess extends to the floor. The recess may also help inhibit re-entrainment of the ejected dirt particles.

The leading or upstream side of the recess preferably forms a relatively sharp corner with the inner surface of the sidewall. The relatively sharp corner may increase the disruptions in the air flow.

An advantage of this configuration may be a more efficient separation of dirt particles from the dirty air stream. Separating dirt particles from the dirty air stream in the dirt collection chamber may help prevent the fine dirt particles from continuing downstream from the cyclone bin assembly, and, for example, fouling the suction motor and/or a pre-motor filter.

A cyclone bin assembly may comprise a cyclone chamber and the dirt collection chamber. The cyclone air outlet may be in communication with an exit duct conduit (which may be a down duct depending upon the orientation of the duct conduit) extending away from the cyclone air outlet and preferably through (e.g., linearly through) a dirt collection chamber facing the end of the cyclone chamber with the air outlet. The down duct may extend from the floor of the cyclone chamber to the floor of the dirt collection chamber. Reinforcing ribs may extend between the down duct and the floor of the cyclone chamber. The ribs may help reduce vibrations in the down duct and/or the floor of the dirt collection chamber, including, for example, vibrations induced by air flowing through the down duct. Optionally, the down duct and/or the support ribs may be removable.

An advantage of this configuration may be that vibration of the down duct and/or the floor of the dirt collection chamber may be reduced. Reducing the vibration of the down duct and/or the floor of the dirt collection chamber may help reduce the overall amount of noise generated by the surface cleaning apparatus and/or improve the separation efficiency of the cyclone chamber and the dirt collection chamber.

The dirt collection chamber may extend from a dirt inlet towards a dirt collection area. For example, the dirt inlet may be in an upper portion of the dirt collection chamber and the dirt collection area may be the floor of the dirt collection chamber. The dirt collection chamber comprises a sidewall (preferably an outer sidewall) that extends longitudinally between opposing first and second ends of the dirt collection chamber. Air circulating within the dirt collection chamber may flow along the sidewall. For example, air may exit the dirt outlet of the cyclone chamber and rotate around the dirt collection chamber and travel towards the dirt collection area. The air will at some point travel in the reverse direction towards the dirt inlet and re-enter the cyclone chamber. The dirt collection chamber may be configured such that the cross sectional area of the dirt collection chamber in a plane transverse to its length changes at least once along the length of the dirt collection chamber. In some embodiments, the cross-sectional area at the first end of the dirt collection chamber is different than the cross-sectional area at the second end of the dirt collection chamber.

An advantage of this configuration may be that changes in the cross-sectional area may be used to enhance the separation efficiency of the cyclone chamber and associated dirt collection chamber. By varying the transverse cross sectional area of the dirt collection chamber, the flow dynamics of the air in the dirt collection chamber may be varied and the amount of dirt that is disentrained from the air may be decreased, or the amount of dirt that is re-entrained may be reduced. For example, if the cross sectional area of the portion of the dirt collection chamber distal to the dirt inlet (e.g., the lower portion) is less than the opposed portion (e.g. upper portion) adjacent the dirt inlet, then the air will slow down as it enters the upper portion. As the velocity decreases, the amount of dirt that may be re-entrained in the return airflow may decrease. If the cross sectional area of the portion of the dirt collection chamber distal to the dirt inlet (e.g., the lower portion) is greater than the opposed portion (e.g. upper portion) adjacent the dirt inlet, then the air will slow down as it enters the lower portion allowing more dirt to be disentrained.

The cyclone chamber and dirt collection chamber assembly may be used in any surface cleaning apparatus. The surface cleaning apparatus comprises an air flow passage extending from a dirty air inlet to a clean air outlet. A suction motor is provided in the air flow passage, and a cyclone bin assembly is provided in the air flow passage, preferably upstream from the suction motor. The cyclone bin assembly may comprise the cyclone chamber and a dirt collection chamber. Dirty air from the dirty air inlet may circulate within the cyclone chamber and may exit the cyclone chamber to circulate within the dirt collection chamber.

The cyclone bin assembly may also comprise a fine particle separator, to help separate relatively fine dirt particles from the dirty air. The fine particle separator may comprise a flow chamber through which the dirty air may circulate. Dirty air, carrying entrained fine dirt particles may flow from the cyclone chamber into the fine particle separator. Air exiting the fine particle separator may re-enter the cyclone chamber, and travel to the suction motor via a cyclone air outlet.

The fine particle separator is configured so that air circulating in the flow chamber may travel at a relatively high velocity, and may travel faster than the air circulating within the cyclone chamber. To help increase the air flow velocity the cross-sectional area of the flow chamber, in the flow direction, may be varied, and preferably is reduced. Accelerating the dirty air to a relatively higher velocity may help disentrain fine dirt particles.

The air outlet of the fine particle separator flow chamber may be configured to disrupt the flow of air exiting the flow chamber. Disrupting the flow of air, for example by introducing eddy currents and/or turbulence and/or directing the air away from the cyclone dirt outlet, may help separate fine dirt particles from the air stream. Separated dirt particles may fall into the dirt collection chamber.

An advantage of this configuration may be a more efficient separation of fine dirt particles from the dirty air stream. Separating fine dirt particles from the dirty air stream in the fine particle separator may help prevent the fine dirt particles from continuing downstream from the cyclone bin assembly, and, for example, fouling the suction motor and/or a pre-motor filter.

In accordance with this aspect, a surface cleaning apparatus comprises an air flow passage extending from a dirty air inlet to a clean air outlet. The air flow passage includes a suction motor. The surface cleaning apparatus may comprise a cyclone chamber in the air flow passage. The cyclone chamber may comprise a cyclone chamber first end and a cyclone chamber second opposed end, a cyclone air inlet, a cyclone air outlet and a cyclone chamber wall. The surface cleaning apparatus may comprise a dirt collection chamber having a dirt collection chamber first end, a dirt collection chamber second opposed end and an outer longitudinally extending sidewall. The outer longitudinally extending sidewall may have at least one recess provided therein.

The recess may extend longitudinally.

The recess may extend essentially from the dirt collection chamber first end to the dirt collection chamber second opposed end.

The recess may comprise an outwardly extending concave surface.

The dirt collection chamber may comprise at least two angularly spaced apart recesses.

The recess may have an upstream side and a downstream side. The upstream side may extend sharply away from the outer longitudinally extending sidewall.

The recess may have an upstream side and a downstream side. The upstream side may meet the outer longitudinally extending sidewall at a sharp corner.

The recess may have an upstream side and a downstream side. The upstream side may extend away from the outer longitudinally extending sidewall at an angle.

The angle may be between about 30° and about 75°, or more.

The recess may have a depth between about 6 mm and about 15 mm, or more.

According to yet another broad aspect of the teachings described herein, a surface cleaning apparatus comprises a cyclone chamber at least partially located within a dirt collection chamber such that at least a portion of the sidewall of the cyclone chamber is spaced from the sidewall of the dirt collection chamber to define a space therebetween in communication with the dirt outlet of the cyclone chamber. Preferably, the space is an annular region such that the sidewall of the dirt collection chamber extends all the way around the sidewall of the cyclone chamber. A support surface extends between the sidewall of the dirt collection chamber and the sidewall of the cyclone chamber. The support surface is configured to direct dirt towards the dirt collection area of the dirt collection chamber.

The cyclone chamber may have a generally circular sidewall, and a generally annular gap may be formed between the cyclone chamber sidewall and a surrounding dirt collection chamber sidewall. The supporting surface may comprise at least one declined surface or ramp surface extending away from the cyclone chamber dirt outlet, to help prevent dirt particles from being retained on the support surface.

An advantage of this configuration is that dirt particles may be more likely to fall into a lower portion of the dirt collection chamber, and may be less likely to be retained on the support surface. This may help facilitate emptying of the dirt collection chamber when a floor of the dirt collection chamber is opened.

Preferably, the dirt collection chamber has a dirt collection surface that is opposed to and faces the end of the cyclone chamber opposed to the end of the cyclone chamber having the dirt outlet (e.g., the dirt collection surface may be below the cyclone chamber). Accordingly, the annular region of the dirt collection chamber may function as a passage from the cyclone dirt outlet to the dirt collection surface. If dirt particles collect on the support surface, then those particles may be re-entrained in air flowing in the annular region.

A further advantage of this configuration is that the amount of dirt particles that collect on the support surface may be reduced and the amount of dirt particles re-entrained in the air stream returning to the cyclone chamber may be reduced, thereby increasing the separation efficiency of the cyclone chamber and dirt collection chamber.

In accordance with this broad aspect, a surface cleaning apparatus comprises an air flow passage extending from a dirty air inlet to a clean air outlet. A suction motor may be provided in the air flow passage. A cyclone chamber may be provided in the air flow passage. The cyclone chamber may comprise a cyclone air inlet, a cyclone air outlet, a cyclone dirt outlet and a cyclone chamber wall. A dirt collection chamber may comprise a first end, a spaced apart opposed second end, a dirt inlet in communication with the cyclone dirt outlet, an annular portion that surrounds at least a portion of the cyclone chamber, an inner side adjacent the cyclone chamber, and an outer side spaced from the cyclone chamber and defined by a dirt collection chamber sidewall. A support surface may extend between the inner side and the outer side and may be configured to direct dirt towards a dirt collection area of the dirt collection chamber.

The support surface may extending part way around the annular portion and may extend away from the dirt inlet.

The support surface may have first and second ends that are angularly spaced apart around the cyclone chamber. The support surface may extend continuously away from the dirt inlet from the first end to the second end.

The support surface may have first and second ends that are angularly spaced apart around the cyclone chamber and a mid-section. The support surface may extend continuously away from the dirt inlet from the mid-section to the first end and to the second end.

The support surface may be curved and may have first and second ends that are angularly spaced apart around the cyclone chamber. The support surface may extend towards the dirt inlet from the first and second ends at an angle of up to 50° from a plane transverse to a longitudinal axis of the cyclone chamber.

The support surface may extend towards the dirt inlet from the first and second ends at an angle from to 15° to 35° from a plane transverse to a longitudinal axis of the cyclone chamber.

The dirt inlet may be provided at the first end and the support surface may be spaced from the dirt inlet towards the opposed second end.

The cyclone dirt outlet may be the dirt collection chamber dirt inlet.

The dirt collection chamber may comprise a dirt collection area that is provided at the opposed second end.

The dirt inlet may be at an upper end of the dirt collection chamber and the dirt collection area may be in a lower portion of the dirt collection chamber.

The cyclone chamber and the dirt collection chamber may be provided in a cyclone bin assembly that is removably mounted to the surface cleaning apparatus.

The cyclone chamber may have a cyclone chamber first end and an opposed cyclone chamber second end and the cyclone dirt outlet is provided adjacent the cyclone chamber first end and the cyclone air inlet is provided at the opposed cyclone chamber second end.

The cyclone chamber air outlet may be provided at the opposed cyclone chamber second end.

The cyclone chamber first end may be an upper end of the cyclone chamber.

The cyclone chamber first end may be provided proximate the first end of the dirt collection chamber.

The cyclone chamber may have a cyclone chamber first end and an opposed cyclone chamber second end. The cyclone chamber may be provided proximate the first end of the dirt collection chamber. The opposed second end of the dirt collection chamber may be spaced from and may face the opposed cyclone chamber second end.

Air may travel in the annular portion in a direction of rotation and the support surface may extend away from the dirt inlet in the direction of rotation.

The support surface may have first and second ends that are angularly spaced apart around the cyclone chamber. The support surface may extend continuously away from the dirt inlet from the first end to the second end.

BRIEF DESCRIPTION OF THE SEVERAL VIEWS OF THE DRAWINGS

Reference is made in the detailed description to the accompanying drawings, in which:

FIG. 7a-7e are alternate schematic representations of a fine particle separator;

DETAILED DESCRIPTION

Figure 1:
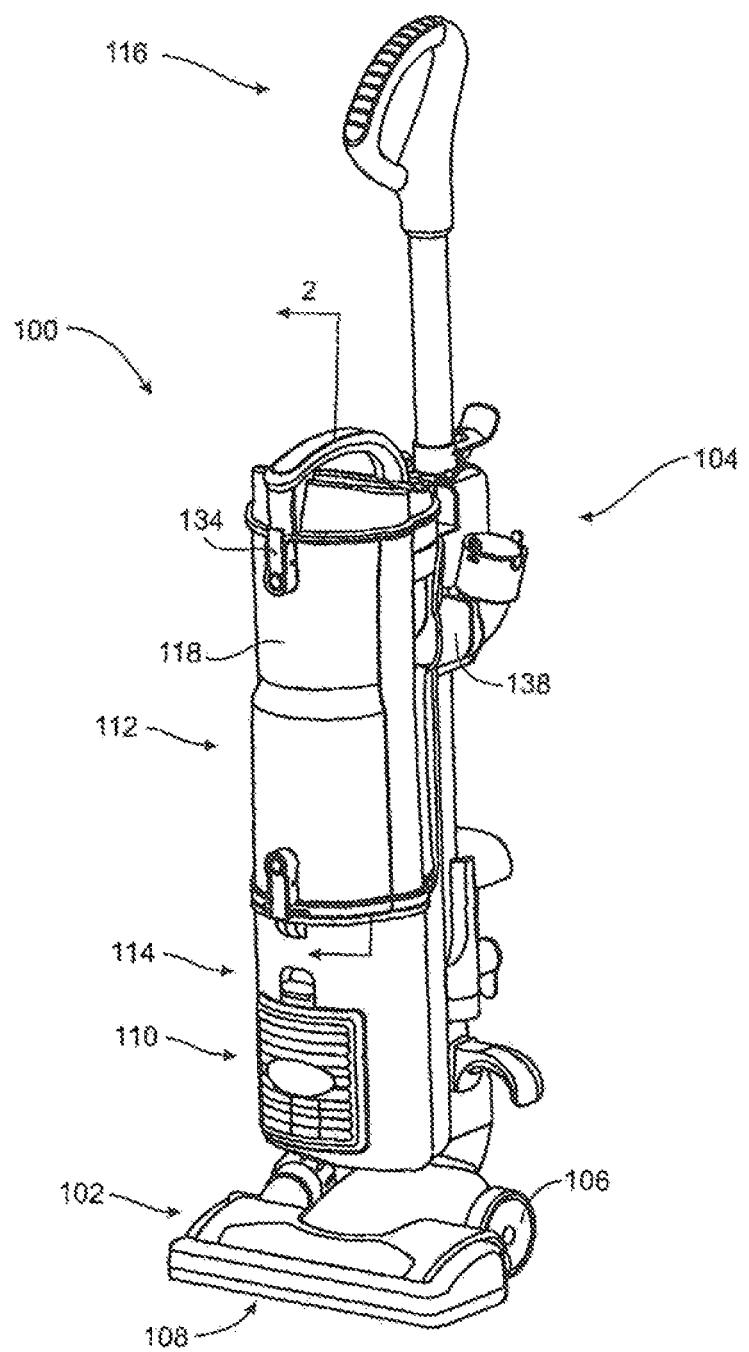
FIG. 1 is a perspective view of an embodiment of a surface cleaning apparatus.

Referring to FIG. 1, an embodiment of a surface cleaning apparatus 100 is shown. In the embodiment illustrated, the surface cleaning apparatus 100 is an upright surface cleaning apparatus. In alternate embodiments, the surface cleaning apparatus may be another suitable type of surface cleaning apparatus, including, for example, a hand vacuum, a canister vacuum cleaner, a stick vac, a wet-dry vacuum cleaner and a carpet extractor.

General Overview

As exemplified in FIG. 1, a surface cleaning apparatus 100 includes a surface cleaning head 102 and an upper section 104.

The surface cleaning head 102 may be any suitable type of cleaning apparatus, including, for example a powered cleaning head having a rotating brush and a brushless cleaning head. The surface cleaning head 102 may be of any suitable configuration and may include at least one wheel or other rolling support to contact the surface being cleaned.

In the illustrated example the surface cleaning head 102 includes a pair of rear wheels 106 and a pair of front wheels (optionally caster-type wheels, not shown) for rolling across a surface and a dirty air inlet 108 provided at the front end.

If the surface cleaning apparatus is an upright surface cleaning apparatus, then the upper section 104 may be moveably connected to the surface cleaning head 102 by any means known in the art. The upper section 104 is moveable (e.g., pivotally mounted to the surface cleaning head 102) between a storage position and an in use position. An air flow passage extends from the dirty air inlet 108 to a clean air outlet 110, which is preferably provided on the upper section 104. The air flow passage may include any suitable combination of rigid conduits, flexible conduits, chambers and other features that may cooperate to direct a flow of air through the surface cleaning apparatus. The upper section 104 may be of various configurations.

A handle 116 is preferably provided on the upper section 104 for manipulating the surface cleaning apparatus. The handle may be of any suitable configuration that may be grasped by a user. While illustrated as being positioned toward the top of the upper section 104, the handle 116 may be provided at any other suitable location on the surface cleaning apparatus 100.

Figure 2:
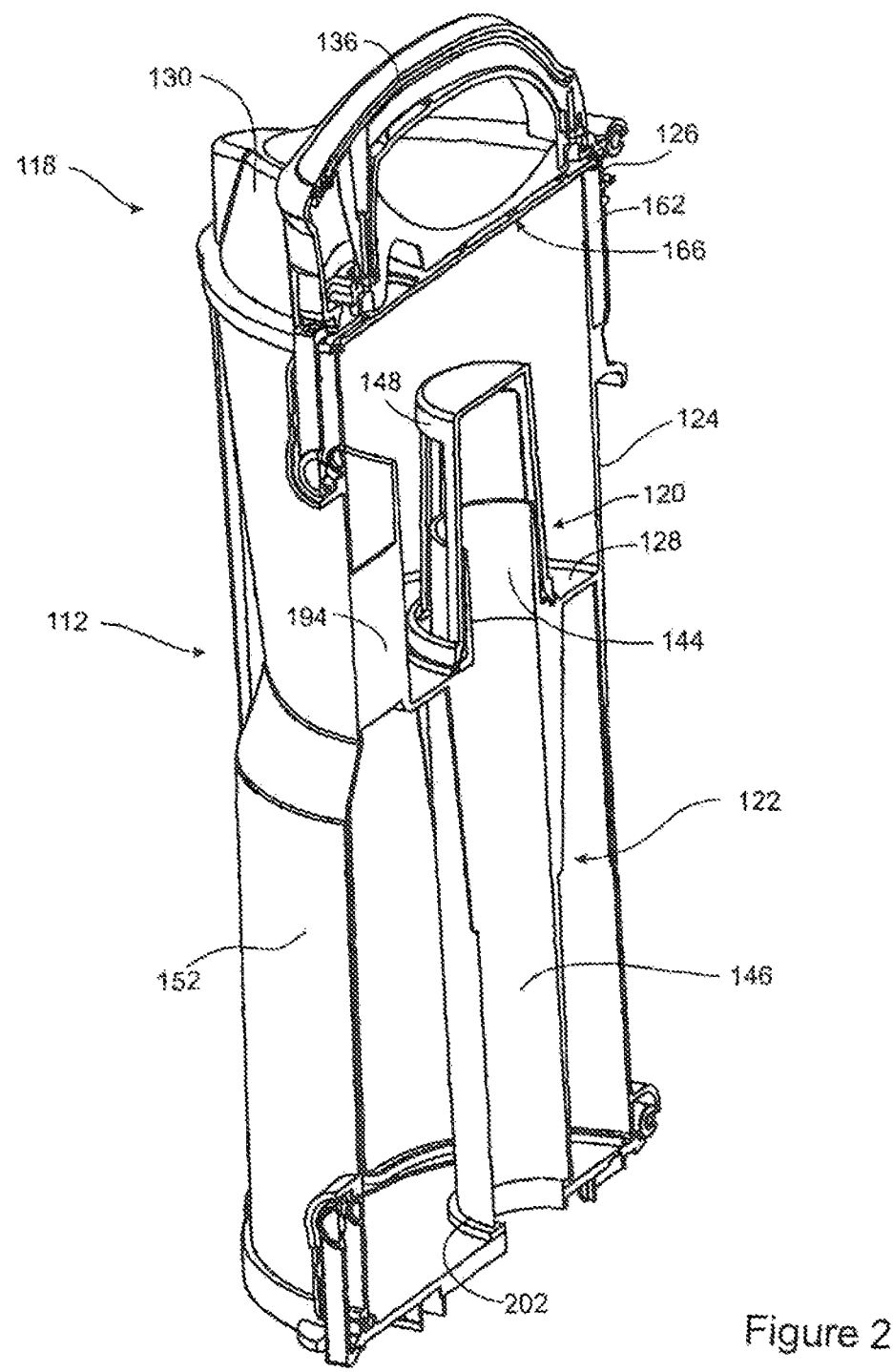
FIG. 2 is perspective cross sectional view of the cyclone bin assembly of the surface cleaning apparatus of FIG. 1, taken along line 2-2 in FIG. 1.

Referring to FIGS. 1 and 2, in the example illustrated, the upper section 104 comprises an air treatment housing 112 and a suction motor housing 114, which is preferably positioned below air treatment housing 112. The air treatment housing 112 houses an air treatment member, which is positioned in the air flow passage downstream from the dirty air inlet 108 to remove dirt particles and other debris from the air flowing through the air flow passage. The air treatment member 112 may be any suitable type of treatment member that includes any one or more of the features disclosed herein and may include, for example, a filter. In the illustrated example, the air treatment member comprises a cyclone bin assembly 118 comprising a cyclone chamber 120 and a dirt collection chamber 122. The suction motor housing 114 is configured to house a suction motor (not shown). Preferably, as exemplified, the suction motor is in air flow communication with the air flow passage, downstream from the cyclone bin assembly 118. The suction motor may be any suitable motor and may be selected based on a plurality of factors including, for example, suction strength, operating noise, power consumption and physical size. The housing 114 may be formed to accommodate the selected suction motor as well as mating with and optionally supporting the cyclone bin assembly 118.

It will be appreciated that, depending upon the aspects that are incorporated into a surface cleaning apparatus, some of the exemplified features may not be used or may be varied so as to be of any design known in the art.

Cyclone Bin Assembly

Various different features for a cyclone bin assembly are disclosed herein. It will be appreciated that a cyclone bin assembly may use one or more of these features. Accordingly, a cyclone bin assembly may use one or more a dirt collection chamber having a variable cross sectional area in a direction transverse to the longitudinal axis of the dirt collection chamber, a fine particle separator, a rib provided in the dirt collection chamber, a reinforced floor construction for a dirt collection chamber, recessed columns in the dirt collection chamber and a ramped or inclined surface in the dirt collection chamber. Aside from containing one or more of these features, a cyclone bin assembly may be of any design.

For example, the cyclone bin assembly may be of any suitable configuration, size and shape. The cyclone chamber may be configured in a plurality of different configurations, including, for example, an upright cyclone, an inverted cyclone and a horizontal or transverse cyclone. The dirt collection chamber may be configured to cooperate with a given cyclone chamber, as well as connecting with the rest of the surface cleaning apparatus. The cyclone chamber may be integrally formed with the dirt collection chamber, or optionally may be separable from the dirt collection chamber.

Preferably, at least a portion of the cyclone bin assembly is removable from the upper section of the surface cleaning apparatus to help facilitate emptying of the dirt collection chamber. To help facilitate emptying and/or inspection at least one of, or both of the top and bottom of the cyclone bin assembly may be openable to provide access to the interiors of the cyclone chamber and/or the dirt collection chamber.

Optionally, some or all of the cyclone bin assembly 118 may be formed from a transparent or semi-transparent material, such as plastic, so that a user may visually inspect the contents of the cyclone bin assembly 118, for example the contents of the dirt collection chamber 122, without having to open or disassemble the cyclone bin assembly 118. This may also allow a user to inspect the interior of the cyclone bin assembly 118 while the surface cleaning apparatus 100 is in use.

As exemplified in FIGS. 2-6, the cyclone chamber 120 may be an inverted cyclone and may be oriented with the dirt inlet at an upper end thereof. In other configurations, it will be appreciated that cyclone chamber 120 may be in a different orientation and may be of a different configuration.

In the illustrated example the cyclone chamber 120 is bounded by a sidewall 124, a first end wall 126 and a second end wall, or floor 128 that are configured to provide an inverted cyclone configuration. A lid 130 covers the top of the cyclone chamber 120, and an inner surface of the lid 130 comprises the first end wall 126 of the cyclone chamber 120. Preferably, the lid 130 is openable and/or detachable from the cyclone bin assembly 118 by any means known in the art.

Figure 4:
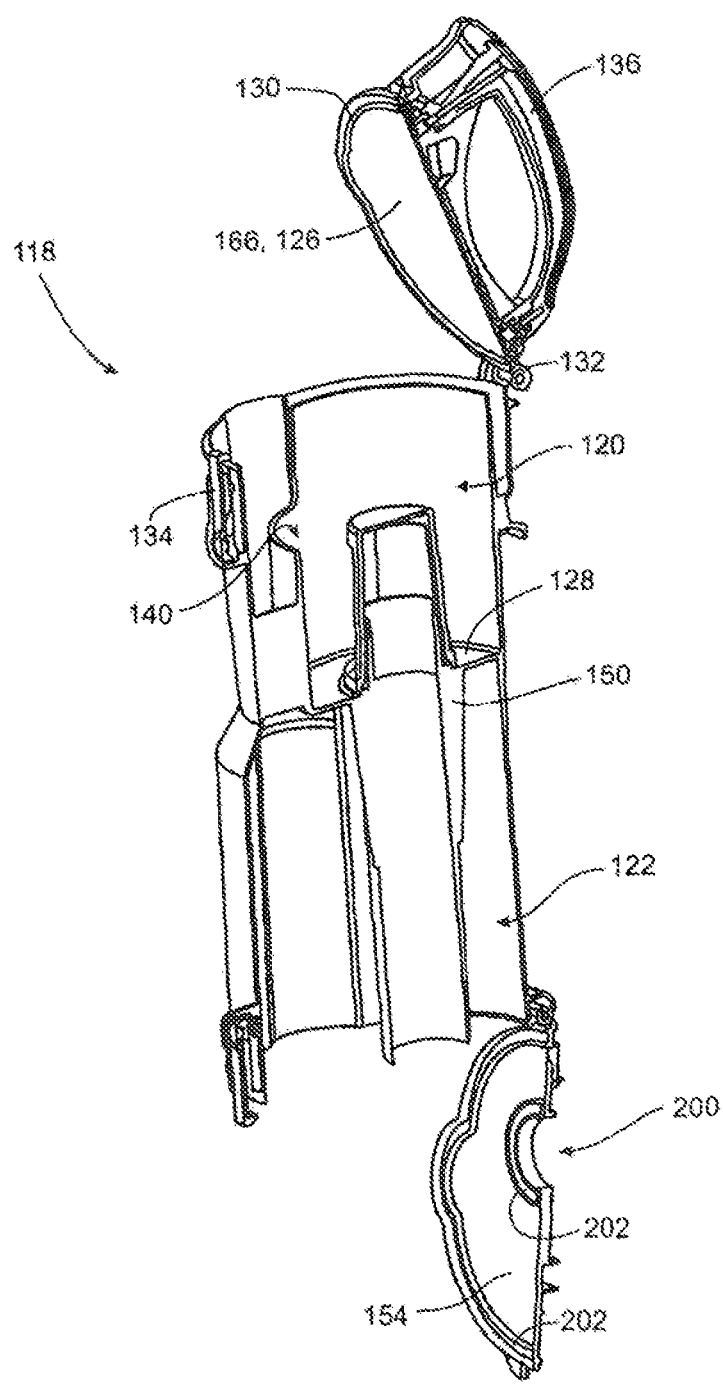
FIG. 4 is a perspective cross sectional view of the cyclone bin assembly as shown in FIG. 2, with its lid and dirt chamber floor open.
Figure 5:
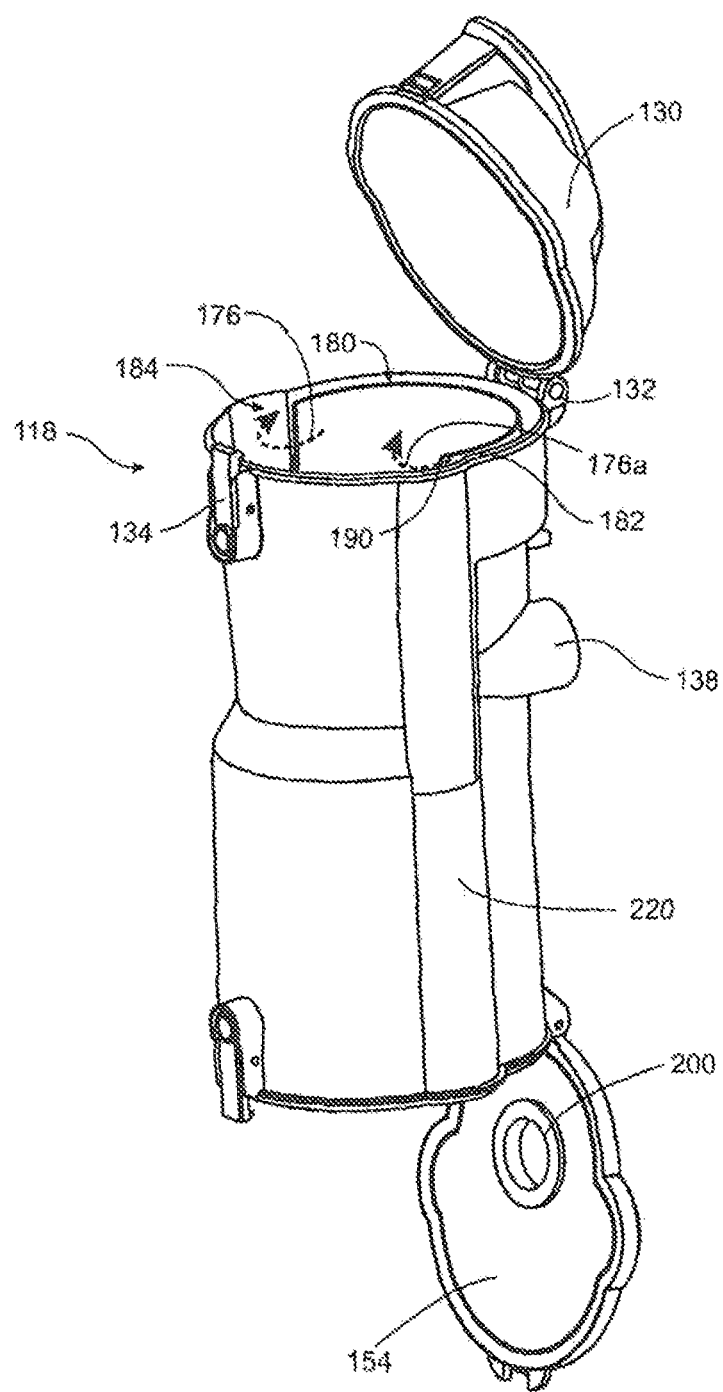
FIG. 5 is a perspective view of the cyclone bin assembly of from the surface cleaning apparatus of FIG. 1, with its lid and dirt chamber floor open.

Opening the lid 130 may allow a user to access the interior of the cyclone chamber 120, for example for cleaning. In the illustrated example, the lid 130 is pivotally connected to the cyclone bin assembly 118 by a hinge 132, and is movable between a closed configuration (FIG. 2) and an open configuration (FIGS. 4 and 5). The lid 130 may be held in the closed position by any means known in the art, such as a releasable latch 134. A handle 136 may be provided on the lid 130. The handle 136 may be used to manipulate the cyclone bin assembly 118 when it is detached from the upper section 104.

Preferably, a tangential air inlet 138 is provided in the sidewall 124 of the cyclone chamber 120 and is in fluid communication with the dirty air inlet 108. The tangential air inlet 138 may be of any suitable design and/or cross sectional area and may be provided at any suitable location along the sidewall 124 of the cyclone chamber 120. Air flowing into the cyclone chamber 120 via the air inlet 138 may circulate around the interior of the cyclone chamber 120 and dirt particles and other debris may become disentrained from the circulating air.

A dirt collection chamber may be provided to receive and retain dirt and debris that is separated from the dirty air flow via the cyclone chamber 120. The dirt collection chamber may be any suitable configuration that may accommodate a given cyclone chamber, and may be formed from any suitable material, including, for example plastic and metal. At least a portion of the air circulating within the cyclone chamber may flow into and circulate within the dirt collection chamber when the cyclone bin assembly is in use. After having circulated within the dirt collection chamber, the air may flow back into the cyclone chamber and exit via the air outlet of the cyclone chamber.

Optionally, the dirt collection chamber may be a unitary, integrally formed chamber.

The dirt collection chamber may be of any suitable cross-sectional shape, and may have a varying cross-sectional shape along its height (as illustrated in FIG. 1 and discussed subsequently)

In the illustrated example, dirt collection chamber 122 is in communication with cyclone chamber 120. Air with entrained dirt exits the cyclone chamber 120 via a cyclone dirt outlet 140 and enters the dirt collection chamber via a dirt collection chamber inlet. After circulating in the dirt collection chamber 122, air may re-enter the cyclone chamber 118 via the dirt collection chamber inlet and the cyclone dirt outlet 140. Preferably, the dirt collection chamber inlet and the cyclone dirt outlet 140 are the same element. For example, as exemplified, the cyclone dirt outlet 140 may be a slot formed between the sidewall 124 and the first end wall 126. The slot 140 may also function as a dirt inlet for the dirt collection chamber 122.

Debris separated from the air flow in the cyclone chamber 120 may travel from the cyclone chamber 120, through the dirt outlet 140 to the dirt collection chamber 122. Preferably, the slot comprises a gap formed between the end of the sidewall 124 and end wall 126 that extends part way around the cyclone chamber 118 (e.g., up to 150°, preferably 30-150°, more preferably 60-120°. Alternatively, the dirt outlet 140 may be of any suitable configuration and may be provided at any suitable position on the cyclone chamber 120.

As exemplified, the cyclone chamber 118 may be positioned within the dirt collection chamber 122 and the dirt collection chamber 122 may comprise an annular portion surrounding part or the entire cyclone chamber 118. Alternately, or in addition, the cyclone chamber 118 may be positioned such that a portion of the dirt collection chamber 122 is positioned opposed to and facing (e.g., below) the air exit end of the cyclone chamber 118. The annular portion may merge into, and be contiguous with, the lower portion of the dirt collection chamber 122.

Figure 3:
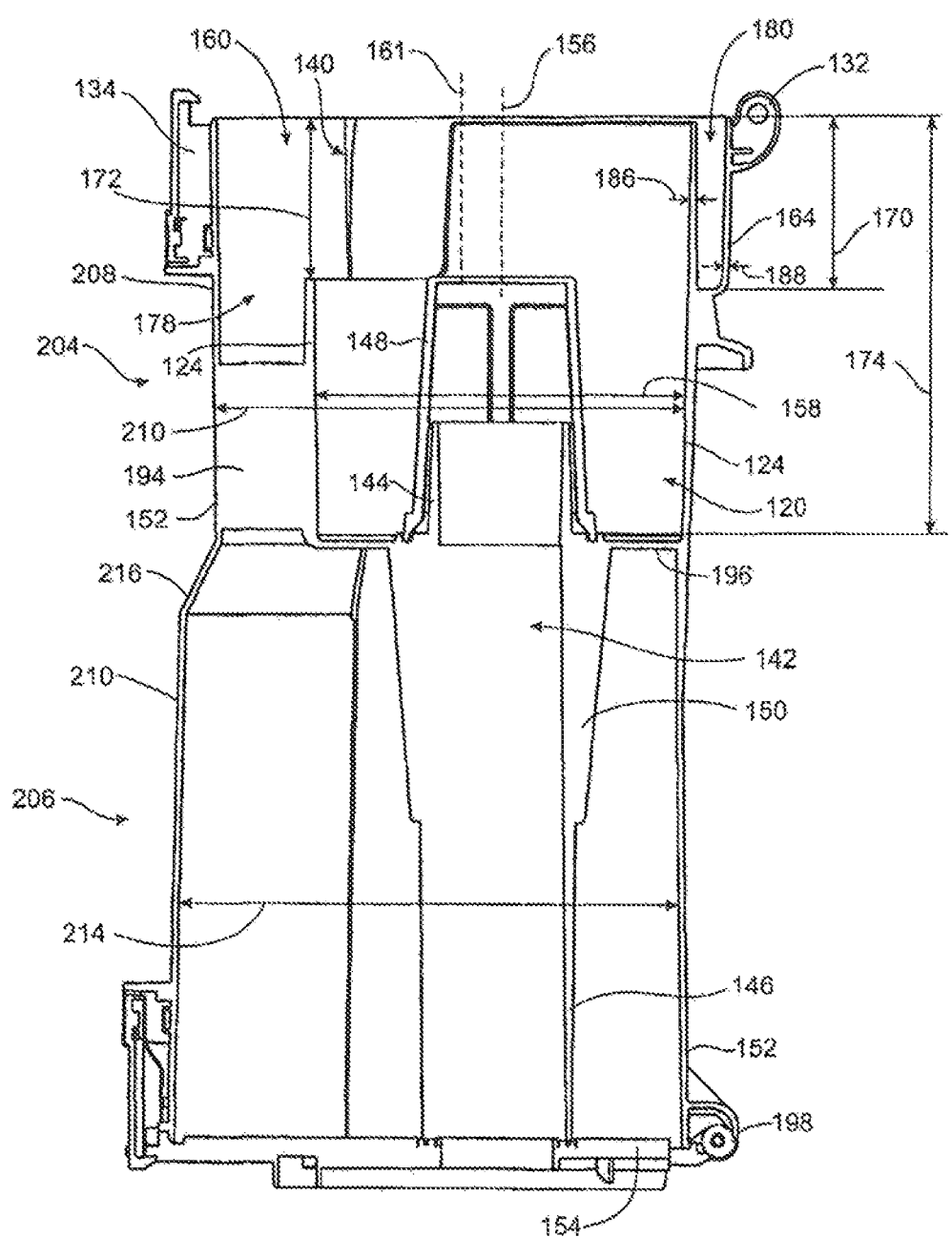
FIG. 3 is a side view of the cyclone bin assembly as shown in FIG. 2.

The cyclone chamber 120 extends along a longitudinal cyclone axis 156 (FIG. 3). In the example illustrated, the longitudinal cyclone axis 156 is aligned with the orientation of the vortex finder 144. The cyclone chamber 120 has a generally round cross-sectional shape and defines a cyclone chamber diameter 158. Alternatively, the cyclone chamber 120 may have any suitable cross-sectional shape and configuration.

Optionally, at least a portion of the cyclone chamber, for example a portion of a sidewall or an end wall, may be integral with portion of the dirt collection chamber sidewall, lid, cover or other feature (for example a fine particle separator as explained below). This may help reduce the overall side of the cyclone bin assembly 118 and/or may help facilitate manufacturing of the cyclone bin assembly.

In the illustrated example, a rear a portion of the dirt collection chamber sidewall 152 is integral with a rear portion of the cyclone chamber sidewall 124, and at least a portion of the second cyclone end wall 128 is integral with a portion of a first dirt collection chamber end wall 196.

Air Exit Duct—Reinforced Floor Construction for a Dirt Collection Chamber

In accordance with one aspect of this disclosure, which may be used by itself or with one or more other aspects set out herein, an end of a dirt collection chamber, preferably the floor, has an air flow conduit extend therethrough and the floor is reinforced by one or more support or stiffening members.

For example, air exiting the cyclone chamber may flow through an air outlet through a portion of the dirt collection chamber. The air outlet may include any suitable type of conduit or air passage that is in air flow communication with the suction motor, including, for example, a down flow duct or other conduit.

Air travelling through the air exit conduit may be travelling at a relatively high speed and may be swirling or otherwise turbulent. Such an air flow may tend to induce vibrations in the air exit conduit. Vibrations in the air exit conduit may tend to increase the noise generated by the cyclone bin assembly and/or may tend to damage components of the surface cleaning apparatus and/or may tend to disturb dirt that has settled out in the dirt collection chamber thereby facilitating the re-entrainment of such dirt.

In accordance with this aspect, the air exit conduit and/or the dirt collection chamber may be configured to help reduce such air-induced vibrations. For example, the air exit conduit may be buttressed by one or more support or stiffening members.

In the illustrated example, air may exit the cyclone chamber 120 via an air outlet 142. As exemplified, the dirt collection chamber 122 is preferably positioned below the lower end wall 128 of the cyclone chamber in which air outlet 142 (e.g., vortex finder 144) is provided. In this orientation, the lower end wall 128 functions as a dirt collection surface. Preferably, the cyclone air outlet includes a vortex finder 144 extending into the cyclone chamber 120 and a passage that extends through a portion of the dirt collection chamber 122, and preferably linearly through the dirt collection chamber, e.g. down duct 146. Optionally, a screen 148 may be positioned over the vortex finder 144. In some embodiments, the screen 148 and vortex finder 144 may be removable. The down duct 146 may comprise a generally cylindrical duct member extending through the interior of the dirt collection chamber 122. Screen 148 may be any screen, shroud or the like known in the art.

In use, the down duct 146 and/or end wall 128 of the cyclone chamber 118 may vibrate. The vibrations may produce an undesirable noise. Further, the vibrations may interfere with the dirt separation efficiency of the cyclone bin assembly. Vibrations induced by air flowing through down duct 146 may be transmitted to lower end wall 128 and may disturb dirt that has settled thereon. Once spaced from lower end wall 128, the disturbed dirt may then be re-entrained in air travelling in the dirt collection chamber. Accordingly as exemplified, one or more stiffening ribs 150 may extend between the down duct 146 and the second end wall 128. Providing stiffening ribs 150 may help reduce the vibration of the down duct 146 and/or second end wall 128 when the surface cleaning apparatus 100 is in use. Alternatively, or in addition to connecting to the second end wall 128, stiffening ribs 150 may be configured to connect to the sidewall 152 and/or floor 154 of the dirt collection chamber 122.

The stiffening ribs 150 may be of any suitable shape and size, including, for example, triangular and rectangular. The ribs 150 may be formed from any suitable material, including, for example metal and plastic. Optionally, the stiffening ribs 150 may be integrally formed with the down duct 146 and/or portions of the cyclone chamber and/or dirt collection chamber. Alternatively, the ribs 150 may be separate members coupled to the down duct 146. The ribs 150 may optionally be detachable or removable.

The stiffening ribs 150 may be sized to help stabilize the down duct 146 while still allowing for a desired air flow circulation within the dirt collection chamber.

Optionally, some of the stiffening ribs 150 may extend from the down duct 146 to the sidewall 152 of the dirt collection chamber. Others of the stiffening ribs 150 may extend from a fixed end adjacent the down duct 146 to a free end spaced apart from the down duct 146.

Optionally, the down duct 146 may be detachable from the second end wall 128 of the cyclone chamber 120. If the down duct 146 is detachable from the second end wall 128, the stiffening ribs 150 may also be detachable from the down duct 146, or the second end wall 128 to help facilitate removal of the down duct 146. Alternatively, the ribs 150 may remain attached to the cyclone bin assembly 118 (for example extending from the floor of the cyclone chamber) when the down duct is removed from the cyclone bin assembly 118.

Preferably, at least one portion of the dirt collection chamber 122 is openable and/or removable to help facilitate emptying of the dirt collection chamber. In the illustrated example the floor 154 of the dirt collection chamber 122 is openable. Opening the dirt collection chamber floor 154 may help facilitate emptying dirt and other debris from the dirt collection chamber 122. In the example illustrated, the dirt collection chamber floor 154 is pivotally connected to the dirt collection chamber sidewall 152 by hinge 198, and is pivotable between and open position (FIGS. 3-5) and a closed position (FIG. 2). The dirt collection floor 154 also comprises an air outlet aperture 200 that allows air from the down duct 146 to pass through the floor 154, and into the suction motor housing 114. Alternatively, any suitable type of releasable fastener may be used to secure the floor 154 to the sidewall 152, including, for example, latches, pins, interference fit and clips. Optionally, sealing gaskets 202, or other sealing members, may be provided around the perimeter of the floor 154 and around the air outlet aperture 200, to help seal the dirt collection chamber 122 when the floor 154 is closed.

Fine Particle Separator

In accordance with another aspect of this disclosure, which may be used by itself or with one or more other aspects set out herein, a fine particle separator is provided exterior to the cyclone chamber and in communication with the cyclone chamber via the cyclone chamber dirt outlet.

Circulating air at a first speed within the cyclone chamber 120 may facilitate separation of a first portion of the dirt and debris from within the air flow. To help facilitate separation of a second, finer portion of the dirt and debris from the air flow it may be desirable to circulate the air at a second speed. Preferably the second speed is faster than the first speed, which may help disentrain finer dirt particles from the air flow.

Optionally, the cyclone bin assembly may include a fine particle separator. The fine particle separator may be positioned outside the cyclone chamber and optionally, may surround at least a portion of the cyclone chamber. Portions of the cyclone chamber sidewalls may be integral with portions of the fine particle separator.

To help increase the velocity of the air flow, the fine particle separator may have a smaller cross-sectional area than the cyclone chamber (in the direction of air flow). The cross-sectional area of the fine particle separator may be constant along its flow path, or may vary along the flow direction. Preferably, the cross-sectional area of the fine particle separator (in the flow direction) may decrease in the direction of the air flow, so that the area at an inlet of the fine particle separator is greater than an area at an outlet of the fine particle separator. This may help increase the velocity of the air flow as it travels through the fine particle separator.

As exemplified, the cyclone bin assembly 118 includes a fine particle separator to help disentrain relatively fine dirt particles from the dirty air stream. In the example illustrated, the fine particle separator comprises an air recirculation chamber 160 surrounding the cyclone chamber 120 wherein air may rotate or swirl prior to re-entering the cyclone chamber 118. Preferably, as exemplified, the air recirculation chamber 160 comprises a generally annular flow chamber 162, part or all of which may be between the cyclone chamber sidewall 124 and an outer bin sidewall 164 (see for example FIG. 6). It will be appreciated that the annular flow chamber may be positioned above the cyclone chamber 118 and that some or all of the annular flow chamber 162 may face the dirt outlet 140.

Optionally, the inner surface of the lid 130 may comprise an upper end wall 166 of the flow chamber 162. In this configuration, a user may access the flow chamber 162 as well as the cyclone chamber 118 when the lid is opened, for example, for cleaning or inspection. Alternatively, the flow chamber 162 may have an upper end wall that is separate from the lid 130. Air circulating within the air recirculation chamber flows in a rotational direction, generally about rotation axis 161.

Referring to FIG. 3, in the illustrated example, the flow chamber 162 surrounds the cyclone chamber 120. Optionally, the height 170 of the flow chamber 162 may be selected so that it is approximately the same height 172 as the dirt outlet 140 of the cyclone chamber 120. In this configuration, substantially all of the air exiting the cyclone chamber 120 may flow into the air recirculation chamber 160. Alternatively, the flow chamber height 170 may be greater than or less than the dirt outlet height 172, and optionally may extend the entire height 174 of the cyclone chamber 120. This may adjust the amount of air exiting the cyclone chamber 120 that is drawn into the air recirculation chamber 160. While illustrated in combination with a vertically oriented cyclone chamber 120, the air recirculation chamber 160 may also be used with a cyclone chamber 120 oriented in another direction, including, for example, a horizontal cyclone chamber.

The fine particle separator is preferably also in communication with the dirt collection chamber 122. Accordingly, dirt collection chamber 122 may collect particulate matter separated by both the cyclone chamber and the fine particle separator. Preferably, the end of the fine particle separator closest to the dirt collection chamber 122 (e.g., the lower end) is continuous with the dirt collection chamber 122. Alternatively, a separate dirt collection chamber may be provided to receive dirt separated by the fine particle separator.

Figure 6:
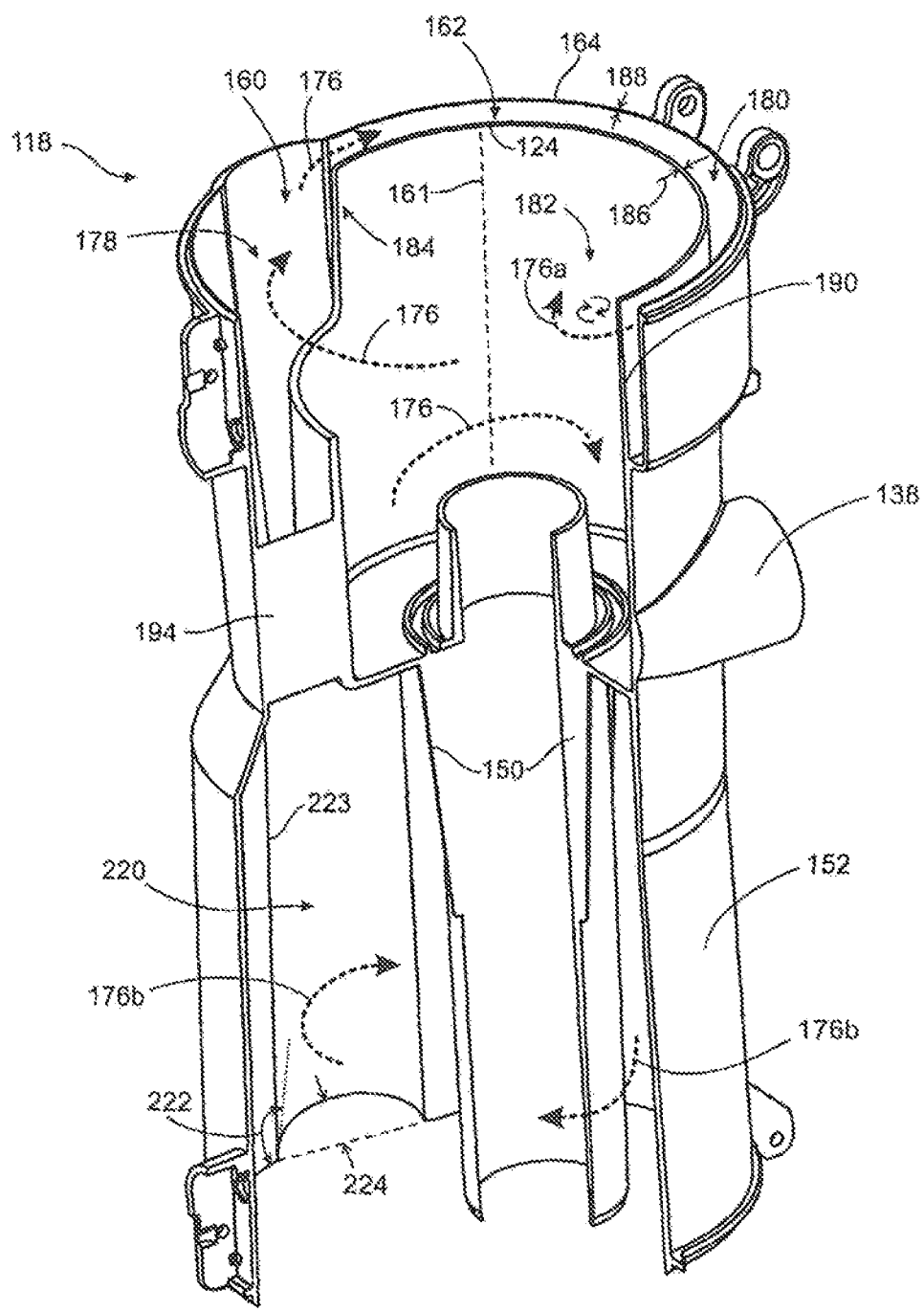
FIG. 6 is a partial cut away view of the cyclone bin assembly of FIG. 5, with the lid and floor removed.
Figure 8:
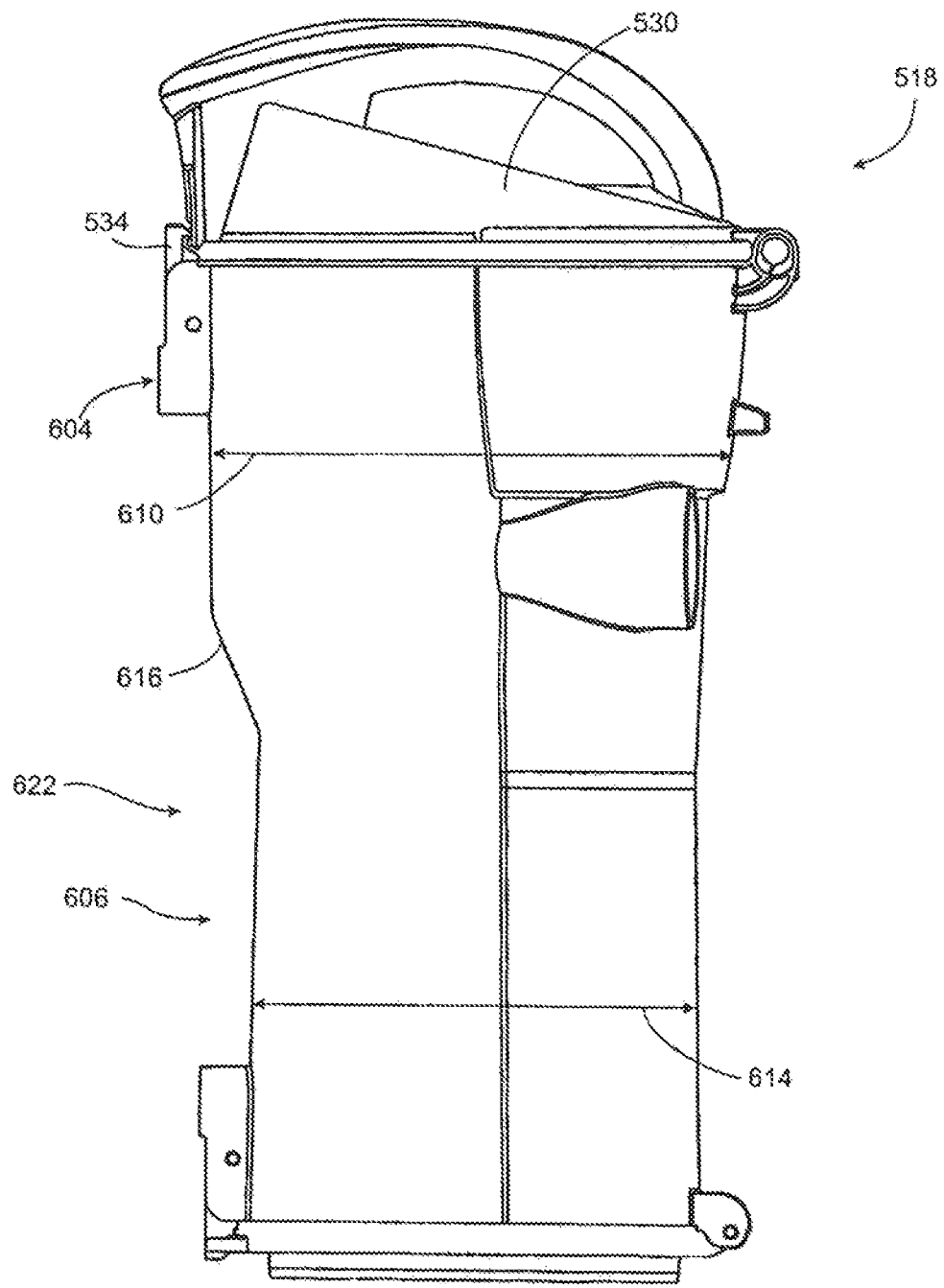
FIG. 8 is a side view of an alternate embodiment of a cyclone bin assembly that is usable with a surface cleaning apparatus.

Referring to FIG. 6, when the surface cleaning apparatus is in use, at least a portion of the dirty air circulating within the cyclone chamber 120 may exit the cyclone chamber 118 via the dirt outlet 140 and travel into the flow chamber 162, as illustrated using arrows 176. The air entering the flow chamber 162 may carry entrained dirt particles. The air circulates in the annular flow chamber 162 before re-entering the cyclone chamber 118. Concurrently, particulate matter separated in the cyclone chamber 118 may be ejected through dirt outlet 140 and pass into the dirt collection chamber 122.

Optionally, the cross sectional area of the annular flow chamber 162 in a plane transverse to the direction of rotation may be constant. Alternatively and preferably, as exemplified, the cross-sectional area of the flow chamber varies, and preferably decreases, in the downstream direction. For example, the flow area of a first upstream portion 178 of the flow chamber 162 is greater than the flow area of a second downstream portion 180 of the flow chamber 162. In this configuration, when air flows from the first portion 178 into second portion 180, the velocity of the air may increase. Preferably, the area may be selected so that air traveling through the second portion 180 of the flow chamber 162 is traveling at a higher velocity than the air circulating within the cyclone chamber 120. Circulating the air at an increased velocity in the flow chamber 162 may help disentrain finer dirt particles then those that are disentrained in the cyclone chamber 118. Air exiting the second portion 180 of the flow chamber passes through a second portion outlet 182. Fine dirt particles disentrained in the air circulation chamber 160 may fall into the dirt collection chamber 122.

As exemplified in FIGS. 5 and 6, the flow area of the second portion 180 remains generally constant between the second portion inlet 184 and the second portion outlet 182. Alternatively, the second portion 180 may be configured so that the flow area of the second portion varies between the inlet and outlet 184, 182. For example, the second portion 180 may be configured so that the area at the outlet 182 is smaller than the area at the inlet 184. This configuration may further increase the velocity of the air traveling from the inlet to the outlet 184, 182. Alternatively, the second portion 180 may be configured so that the area at the inlet 184 is less than the area at the outlet 182.

The cross-sectional area of the second portion 180 may be varied using any suitable technique, including, for example, varying the spacing between the sidewalls of the second portion 180, varying the thickness of one or more of the sidewalls and/or placing one or more inserts or other members within the flow area of the second portion 180. To vary the cross-sectional area in the second portion 180 in the illustrated example, the thickness 186 of a portion of the cyclone chamber sidewall 124 may be varied, or the thickness 188 of the outer bin sidewall 164 may be varied, or both. Alternatively, instead of modifying the wall thicknesses 186, 188, a separate ramp insert may be positioned within the second portion 180 of the flow chamber. Alternately, or in addition, the height 170 of the annular flow region 162 may be varied.

Referring to FIG. 7a, in a schematic representation of the second portion 180 of the flow chamber 162, the thickness 186 of the cyclone chamber sidewall 124 at the inlet 184 is equal to the thickness 186 of the cyclone chamber sidewall 124 at the outlet 182. Similarly, the thickness 188 of the sidewall 164 at the inlet 184 is equal to the thickness 188 of the sidewall 164 at the outlet 182. While not shown, the height may remain constant such that the cross sectional area remains constant.

Figure 10:
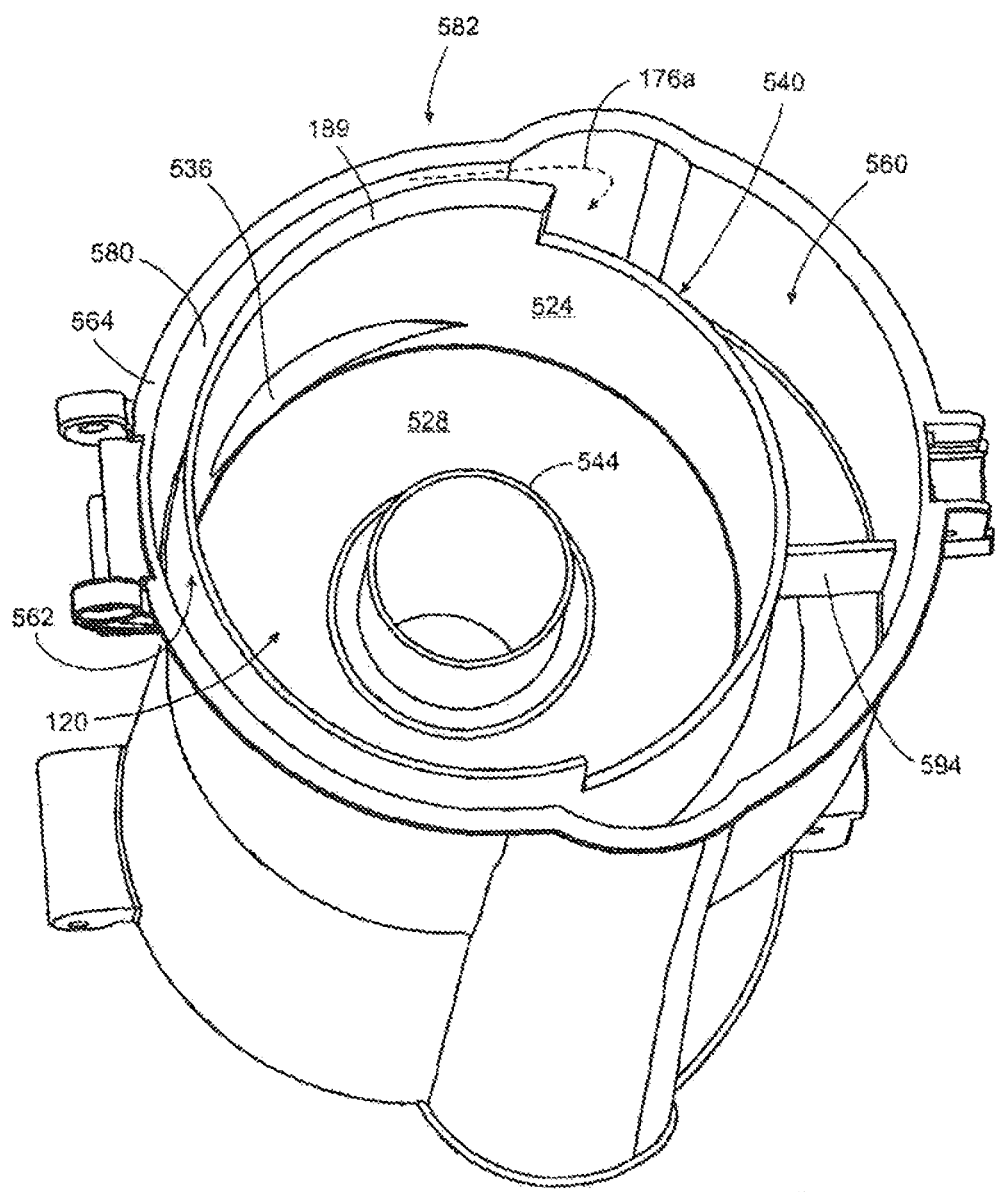
FIG. 10 is a top perspective view of the cyclone bin assembly of FIG. 8, with the lid removed.

In other embodiments, the wall thickness 186 at the outlet 182 may be different than the wall thickness 186 at the inlet 184, as illustrated using schematic representations in FIGS. 7b-7e. Similarly, the wall thickness 188 may be varied. FIGS. 7e and 10 illustrate embodiments in which a separate ramp member 189 is placed within the second portion 180 of the flow chamber 162, instead of varying the wall thickness 186 of the cyclone chamber sidewall 124.

Disrupting the air flow as it exits the second portion, for example using an air contacting member, may help disentrain dirt particles. It may also be beneficial to temporarily divert the air flow exiting the second portion 180 away from the dirt inlet 140 to help disentrain further dirt particles which may help reduce the likelihood that dirt particles will be carried within the air flow when it re-enters the cyclone chamber 120. Referring to FIGS. 5, 6 and 10, in the illustrated example, a portion of the cyclone chamber sidewall 124 adjacent the second portion outlet 182 may be configured to disrupt the flow of air exiting the second portion outlet 182 and\or direct the air flow away for the dirt inlet 140. For example, the side wall or a ramp insert 189 may be provided at the outlet 182 to that the distance between the air flow region of portion 180 at outlet 182 and outlet 140 is increased. This may cause the air to make a sharper turn to return to the cyclone chamber, which may assist in separating finer dirt particles from the air flow.

Alternately, or in addition, the cyclone chamber sidewall 124 may comprise a relatively sharp corner 190, other any other suitable feature, which may also help disrupt the air flow 176. Disrupting the air flowing past the corner 190 may help disentrain dirt particles from the air flow 176, and may help urge the air flow 176a to re-enter the cyclone chamber 120 via the dirt outlet 140.

Optionally, the dirt outlet slot 140 may be configured to have a varying slot height 172 along its length. Varying the height of the dirt outlet slot 140 may alter the behaviour of the air flowing through the slot 140, between the cyclone chamber 120 and the air recirculation chamber 160, for example air flows 176 and 176a. Alternatively, the dirt outlet need not be a single continuous slot, but can be any other suitable shape having one or more openings in the cyclone chamber sidewall.

Rib in the Dirt Collection Chamber

In accordance with another aspect of this disclosure, which may be used by itself or with one or more other aspects set out herein, one or more ribs within the dirt collection chamber, and optionally extending between the dirt collection chamber sidewall and the cyclone chamber sidewall may be provided to help disentrain dirt from air circulating within the dirt collection chamber.

The ribs are air contacting members and may be of any suitable construction so as to disrupt an air stream that may be travelling in the dirt collection chamber. Accordingly, the ribs may be substantially solid and/or may contain one or more apertures or other openings through which air may flow. The dirt collection chamber preferably comprises at least an annular section and at least one rib, and preferably one rib, is positioned in the annular portion. The rib may extend along a portion of the length of the annular portion and preferably along all or essential al of the entire length.

The ribs may be formed from any suitable material and may be integrally formed with the cyclone bin assembly or provided as separate members. The ribs may be any suitable shape, and may be positioned as substantially vertical planar members, or positioned in any suitable orientation relative to the direction of air flow.

As exemplified in FIGS. 2-4, the dirt collection chamber comprises an annular portion and optionally, one or more ribs 194 may extend between the cyclone chamber sidewall 124 and the dirt collection chamber sidewall 152. The rib may be used with or without the fine particle separator described previously.

Optionally, the ribs may extend only partway across the annular spaced between the sidewalls (having a free end spaced apart from one of the sidewalls 124, 152), but preferably extend completely across the annular space between the dirt collection chamber and cyclone sidewalls 152, 124. Preferably, the rib 194 is positioned generally adjacent or proximate the dirt outlet 140 and more preferably, is positioned on the side of the dirt outlet 140 towards end wall 154 of the dirt collection chamber 122.

In this configuration, the rib is provided in the upper annular portion of the dirt collection chamber 122 and may be disposed below the optional fine particle separator if one is used. The rib 194 may accordingly impede the flow of the air flow circulating within an upper portion of the dirt collection chamber 122, which may help separate dirt particles from the air stream and may reduce re-entrainment of separated particulate matter. Dirt particles contacting the rib 194 may be disentrained from the air flow and fall in the lower portion of the dirt collection chamber 122.

Variable Dirt Collection Cross Sectional Area

In accordance with another aspect of this disclosure, which may be used by itself or with one or more other aspects set out herein, the cross-sectional area of the dirt collection chamber may be varied along its height to help alter the characteristics of the air circulating within the dirt collection chamber.

It will be appreciated that the dirt collection chamber is positioned exterior to the cyclone chamber and may be of various designs. As exemplified in FIG. 3, the dirt collection chamber 122 comprises an upper portion 204 and a lower portion 206. The upper portion 204 is positioned adjacent the cyclone chamber 120 and comprises an upper portion sidewall 208 that at least partially surrounds the cyclone chamber 120. The upper portion 204 may also comprise some or all of the air recirculation chamber 160. In this configuration the upper portion 204 of the dirt collection chamber 122 has a generally round cross-sectional shape, and has an upper dirt chamber diameter 210.

As exemplified, the lower portion 206 of the dirt collection chamber is positioned generally below the cyclone chamber 120. The lower portion 206 has a lower portion sidewall 212 with a generally round cross-sectional shape, and has a lower dirt chamber diameter 214. In the illustrated configuration, the lower dirt chamber diameter 214 is greater than the upper dirt chamber diameter 210. In this configuration, the dirt collection chamber 122 may be described as having a stepped out configuration. A transition surface 216 may connect the upper and lower portion sidewalls 208, 212. In the illustrated example, the transition surface 216 comprises an angled wall. In other examples, the transition surface may have another configuration, including, for example a horizontal or curved wall.

When air flows across the transition surface 216 from one portion to another (e.g. from the upper portion 204 to the lower portion 206 or from the lower portion 206 to the upper portion 204) the disruption in the air flow induced by the flowing from one portion to another may help disentrain dirt particles from the air flow. The features of the transition surface 216 and its intersection with sidewalls 208 and 212 may be selected to help improve dirt separation.

The cross sectional area or diameter of the dirt collection chamber may be varied using a plurality of other sidewall configurations. For example, referring to FIGS. 8-11, another embodiment of a cyclone bin assembly 518 that may be used with a surface cleaning apparatus includes a cyclone chamber 520 and a dirt collection chamber 522. Features of the cyclone bin assembly 518 that are analogous to features of cyclone bin assembly 118 are represented by like reference characters, indexed by 400. Dirt collection chamber 522 includes an upper portion 604 and a lower portion 606. In this embodiment, the upper dirt collection diameter 610 is greater than the lower dirt collection diameter 614. In this configuration, the dirt collection chamber 522 may be described as having a stepped in configuration.

Figure 12A:
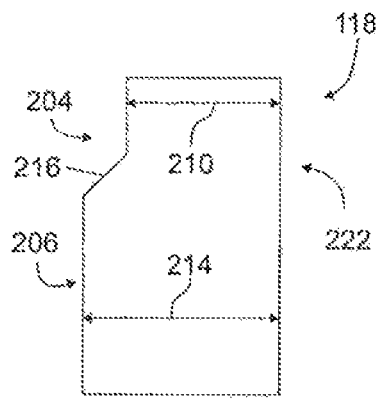
FIG. 12a is a schematic side view of the cyclone bin assembly of FIG. 2.
Figure 12B:
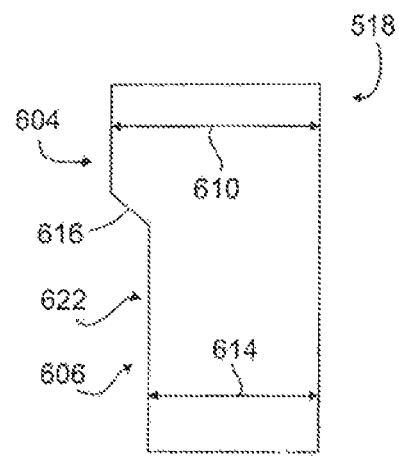
FIG. 12b is a schematic side view of the cyclone bin assembly of FIG. 8.
Figure 12C:
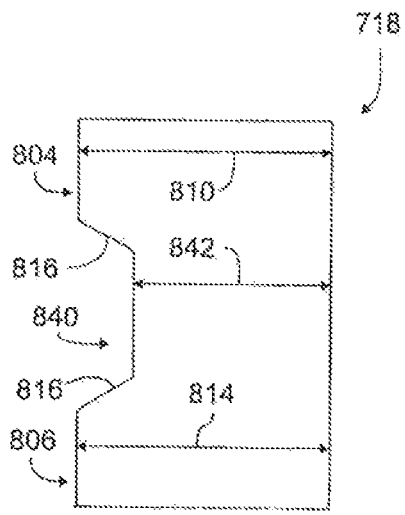
FIG. 12c is a schematic side view of an alternate embodiment of a cyclone bin assembly usable with a surface cleaning apparatus.
Figure 12D:
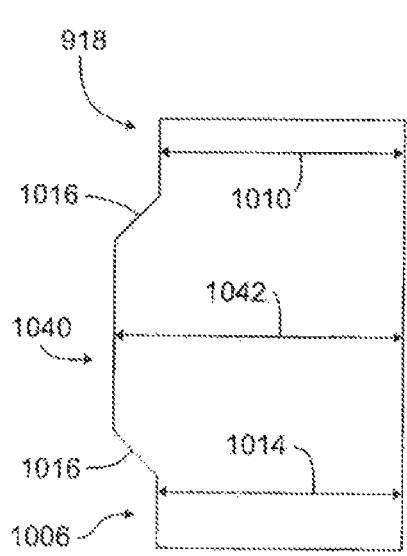
FIG. 12d is a schematic side view of an alternate embodiment of a cyclone bin assembly usable with a surface cleaning apparatus.

By way of further example, referring to FIG. 12a, a schematic representation of the stepped out cyclone bin assembly 118 illustrates a dirt collection chamber 122 with a lower portion diameter 214 that is greater than the upper portion diameter 210. FIG. 12b, is a schematic representation of the stepped in cyclone bin assembly 518, in which the upper portion diameter 610 is greater than the lower portion diameter 614. Other variable cross-section dirt collection chamber configurations may also be used. For example, FIG. 12c is a schematic representation of another embodiment of a cyclone bin assembly 718. The dirt collection chamber 722 in cyclone bin assembly 718 comprises an upper portion 804 having an upper portion diameter 810, a lower portion 806 having a lower portion diameter 812 and an intermediate portion 840 having an intermediate portion diameter 842. The upper and lower portion diameters 810, 814 are generally equal, and are both greater than the intermediate portion diameter 842. In this configuration the dirt collection chamber 822 comprises two transition surfaces 816. FIG. 12d, is a schematic representation of another embodiment of a cyclone bin assembly 918. The dirt collection chamber 922 in cyclone bin assembly 918 comprises an upper portion 1004 having an upper portion diameter 1010, a lower portion 1006 having a lower portion diameter 1014 and an intermediate portion 1040 having an intermediate portion diameter 1042. In this example, the upper and lower portion diameters 1010, 1014 are generally equal, and are both less than the intermediate portion diameter 1042. Like dirt collection chamber 718, dirt collection chamber comprises two transition surfaces 1016.

Changes in the cross-sectional area may be used to enhance the separation efficiency of the cyclone chamber and associated dirt collection chamber. By varying the transverse cross sectional area of the dirt collection chamber, the flow dynamics of the air in the dirt collection chamber may be varied and the amount of dirt that is disentrained from the air may be altered, or the amount of dirt that is re-entrained may be reduced. For example, if the cross sectional area of the portion of the dirt collection chamber distal to the dirt inlet (e.g., the lower portion 206) is less than the opposed portion (e.g. the upper portion with rib 194) adjacent the dirt inlet, then the air will slow down as it enters the upper portion. As the velocity decreases, the amount of dirt that may be re-entrained in the return airflow may decrease. If the cross sectional area of the portion of the dirt collection chamber distal to the dirt inlet (e.g., the lower portion) is greater than the opposed portion (e.g. upper portion) adjacent the dirt inlet, then the air will slow down as it enters the lower portion allowing more dirt to be disentrained.

It will be appreciated that this aspect is preferably used with a cyclone having an upper dirt outlet and/or a fine particle separator and/or a dirt collection chamber having an annular portion.

Dirt Collection Chamber Wall Recesses

In accordance with another aspect of this disclosure, which may be used by itself or with one or more other aspects set out herein, the sidewall of the dirt collection chamber may be configured to include one or more recesses. These recesses, (which may be referred to as bump-outs) are configured to help cause eddy currents to disrupt the air that may be circulating in the dirt collection chamber and thereby assist in disentraining dirt projections and other structure features. These recesses may extend substantially the entire length of the dirt collection chamber, or alternatively may be limited to select portions of the dirt collection chamber. The features may be integrally formed with the cyclone bin assembly, or provided as separate members.

Referring to FIGS. 5 and 6, in the illustrated example, the dirt collection chamber sidewall 152 may comprise two recessed columns 220, on opposing sides of the dirt collection chamber 122. The recessed columns 220 may provide a discontinuity on the inner surface of the outer dirt collection chamber sidewall 152, which may create eddy currents or other disruptions in the dirty air flow circulating within the dirt collection chamber 122, represented by arrows 176b. Preferably, the angle 222 formed at the intersection between the dirt collection chamber sidewall 152 and the upstream or leading edge 223 of the recessed column 220 walls is sufficient to create a relatively sharp corner, which may help disrupt the air flow. Preferably, the angle 222 is between about 30 and about 90°, and more preferably is between 45 and 90°. Disrupting the circulation of the dirty air passing over the recessed columns 220 may help disentrain dirt particles. In other embodiments, the dirt collection chamber 122 may comprise a different number of recessed columns 220 and the columns 220 may be formed in any suitable shape, including, for example square or rectangular cross-sectional shapes.

The depth 224 of the recessed columns 220 may be selected to provide a sufficient depth such that an area with reduced or no air flow is created such that dirt particles may settle out and travel to the dirt collection floor. Collecting dirt particles within the recessed columns 220 may also help prevent re-entrainment of the dirt particles in the circulating air flow. Preferably, the depth 224, represented using a dashed line to approximate the circumference of the uninterrupted sidewall 152, is between about 6 and about 18 millimeters, or optionally may be greater than 18 millimeters or less than 6 millimeters.

Connecting Wall

Figure 9:
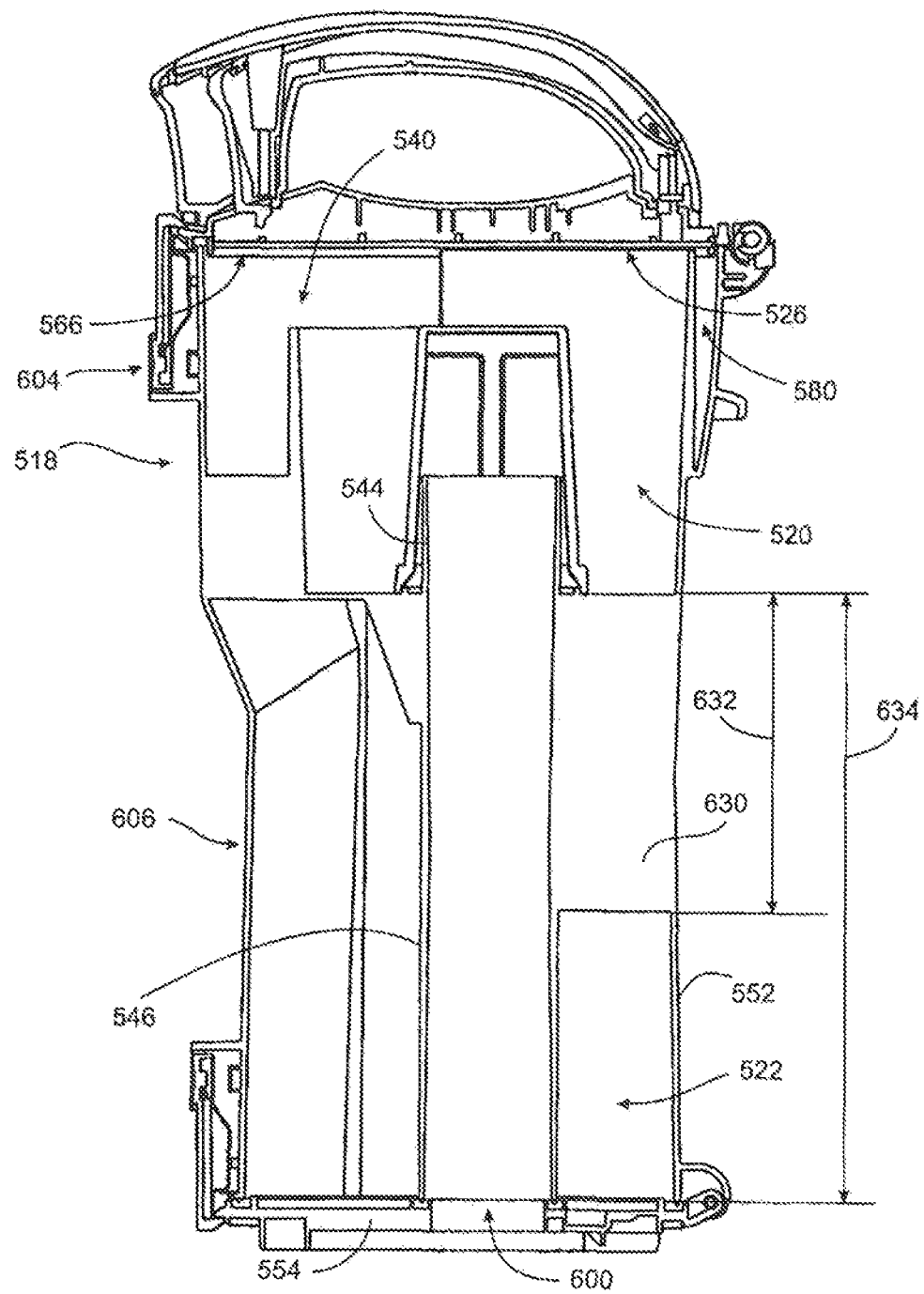
FIG. 9 is cross-sectional side view of the cyclone bin assembly of FIG. 8.
Figure 11:
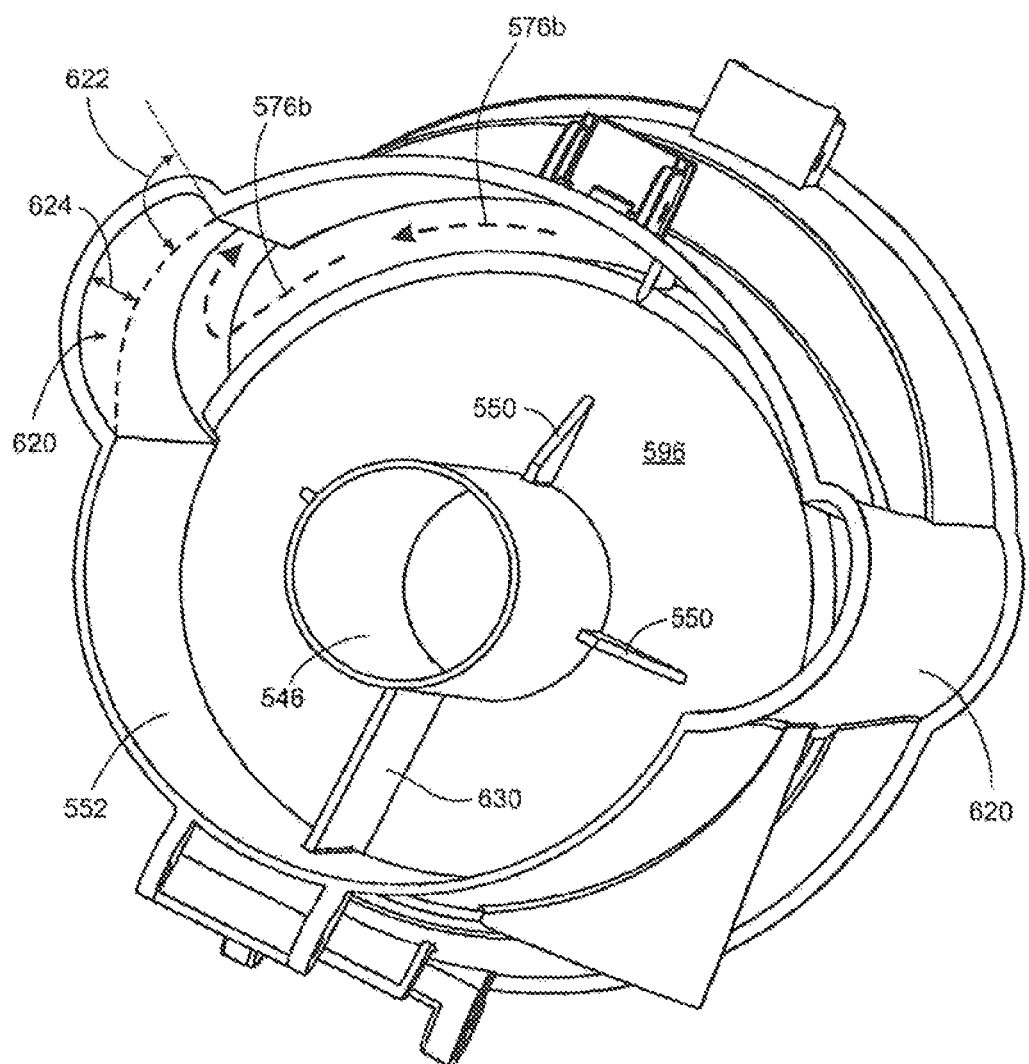
FIG. 11 is a bottom perspective view of the cyclone bin assembly of FIG. 8, with the dirt chamber floor removed.

Referring to FIGS. 9 and 11, as an alternative to in addition to the stiffening ribs 550, the down duct 546 may include a generally vertically oriented connecting wall 630 extending between the down duct 546 and the dirt collection chamber sidewall 552. The connecting wall may be used by itself or with any one or more other aspects of this disclosure. The connecting wall 630 may be of any suitable size and configuration, and may be positioned in any suitable orientation. The connecting wall 630 may extend along substantially the entire height of the down duct 546, or may be shorter than the down duct 546. The connecting wall 630 may be positioned in any suitable location along the height of the down duct 546 and optionally may be configured to contact one or both of the cyclone chamber floor and the dirt collection chamber floor, or may be spaced apart from both floors.

Preferably, as illustrated, the connecting wall 630 extends downward from the upper end wall 596, and has a height 632 that is between about 5% and about 80% of the height 634 of the lower portion 606 of the dirt collection chamber 522. More preferably, the connecting wall height 632 is between about 15% and 50% of the lower portion height 634. The connecting wall 630 may impede the circulation of the dirty air flowing within the lower portion 606. Impeding the circulation of the dirty air flow may help disentrain dirt particles from the dirty air flow. The disentrained particles may then be retained within the lower portion 606 when the circulating air re-enters the cyclone chamber 520. The connecting wall 630 may also provide additional stiffness and vibration damping to the down duct 546, as described above.

Ramped or Inclined Surface in the Dirt Collection Chamber

In accordance with another aspect of this disclosure, which may be used by itself or with one or more other aspects set out herein, a dirt collection chamber may include a ramped or inclined surface in the dirt collection chamber. Dirt particles and other debris circulating within the dirt collection chamber may tend to settle or be deposited on any horizontal surfaces within the dirt collection chamber. Dirt that is resting on horizontal surfaces of the dirt collection chamber may become trapped or hung-up within the dirt collection chamber and may be difficult to empty from the chamber (for example by opening the floor of the chamber and allowing the dirt to fall our under the force of gravity). Accordingly, configuring such surfaces as inclined or ramped surfaces may help to reduce or minimize the surface area of any surfaces or other features that may trap or retain dirt particles.

This aspect will be discussed with reference to FIG. 13-16 which disclose another example of a surface cleaning apparatus 2100. Surface cleaning apparatus 2100 includes a surface cleaning head 2102 and an upper section 2104. The surface cleaning apparatus 2100 is generally similar to surface cleaning apparatus 100, and like features are identified using like reference numerals indexed by 2000. It will be appreciated that the surface cleaning apparatus of FIGS. 13-16 is an exemplary embodiment and it may have any of the features discussed with respect to the exemplary embodiment of FIGS. 1-12 and thee surface cleaning apparatus of FIGS. 1-12 may have any of the features discussed with respect to the exemplary embodiment of FIGS. 13-16.

The surface cleaning head 2102 includes a pair of rear wheels 2106 and a pair of front wheels (not shown) for rolling across a surface and a dirty air inlet 2108. The upper section 2104 is moveably connected to the surface cleaning head 2102. The upper section 2104 is moveable (e.g., pivotally mounted) between a storage position and an in use position. An air flow passage extends from the dirty air inlet 2108 to a clean air outlet 2110 on the upper section 104. A handle 2116 is provided on the upper section 2104 for manipulating the surface cleaning apparatus 2100.

Figure 13:
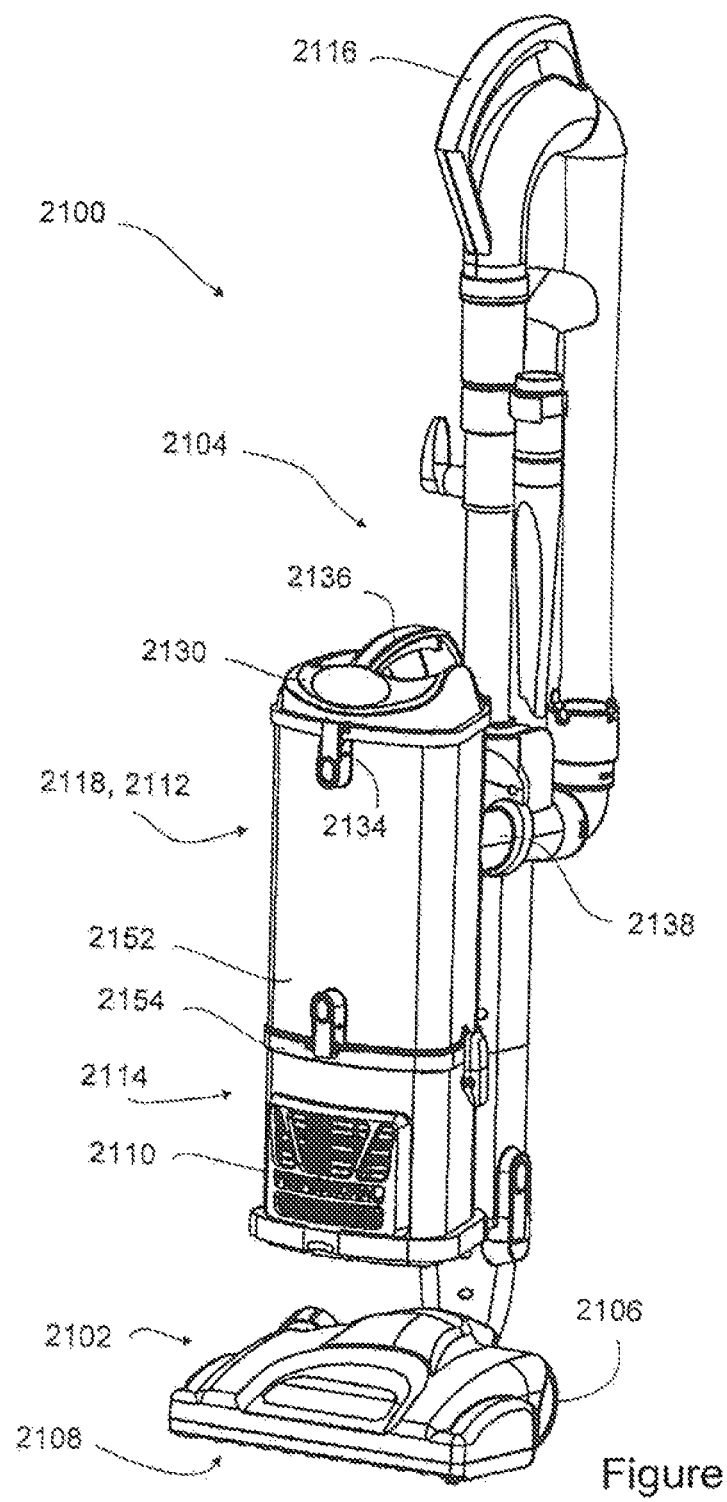
FIG. 13 is a perspective view of another example of a surface cleaning apparatus.
Figure 14:
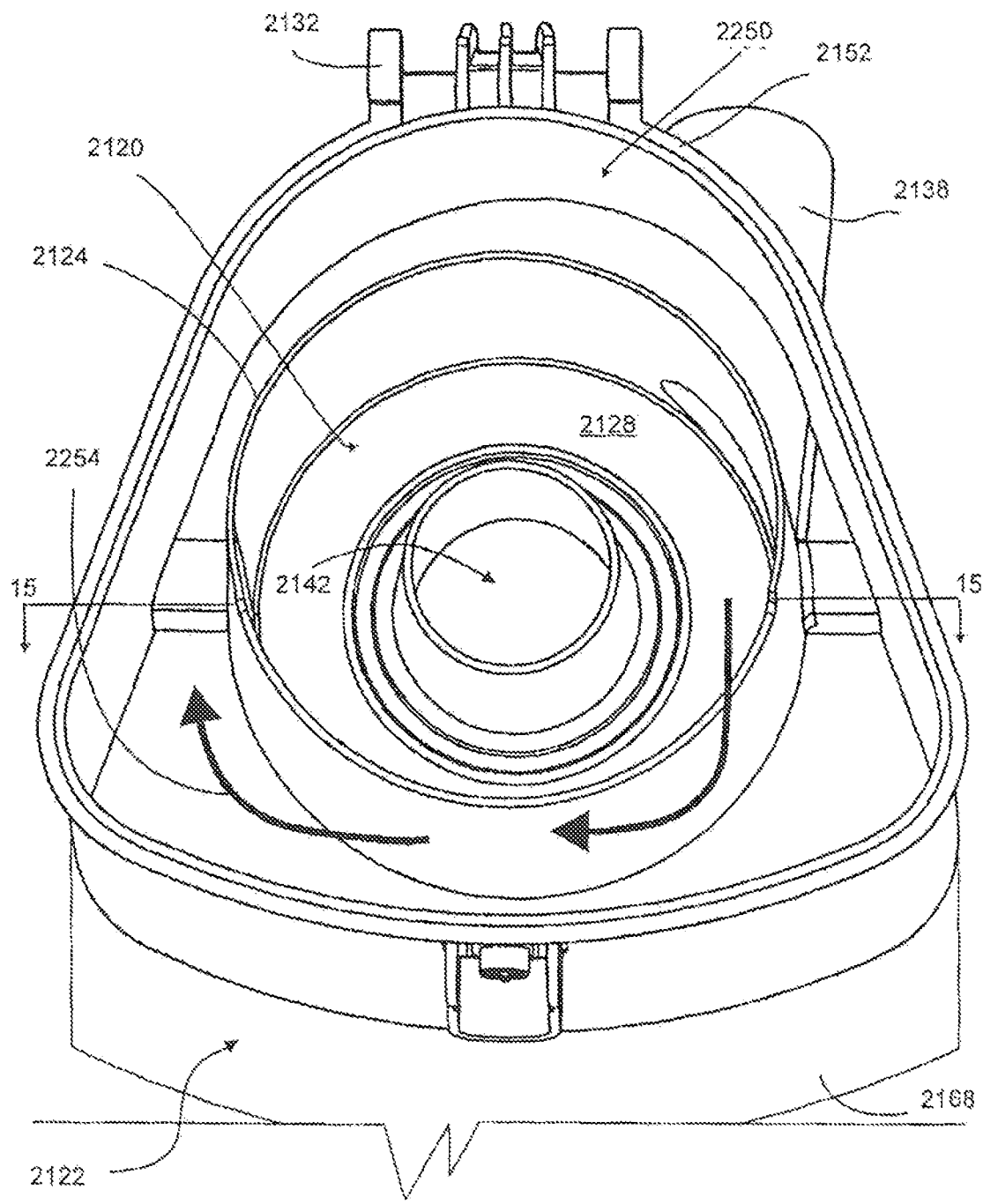
FIG. 14 is a perspective view of another cyclone bin assembly with the lid and floor removed.
Figure 15:
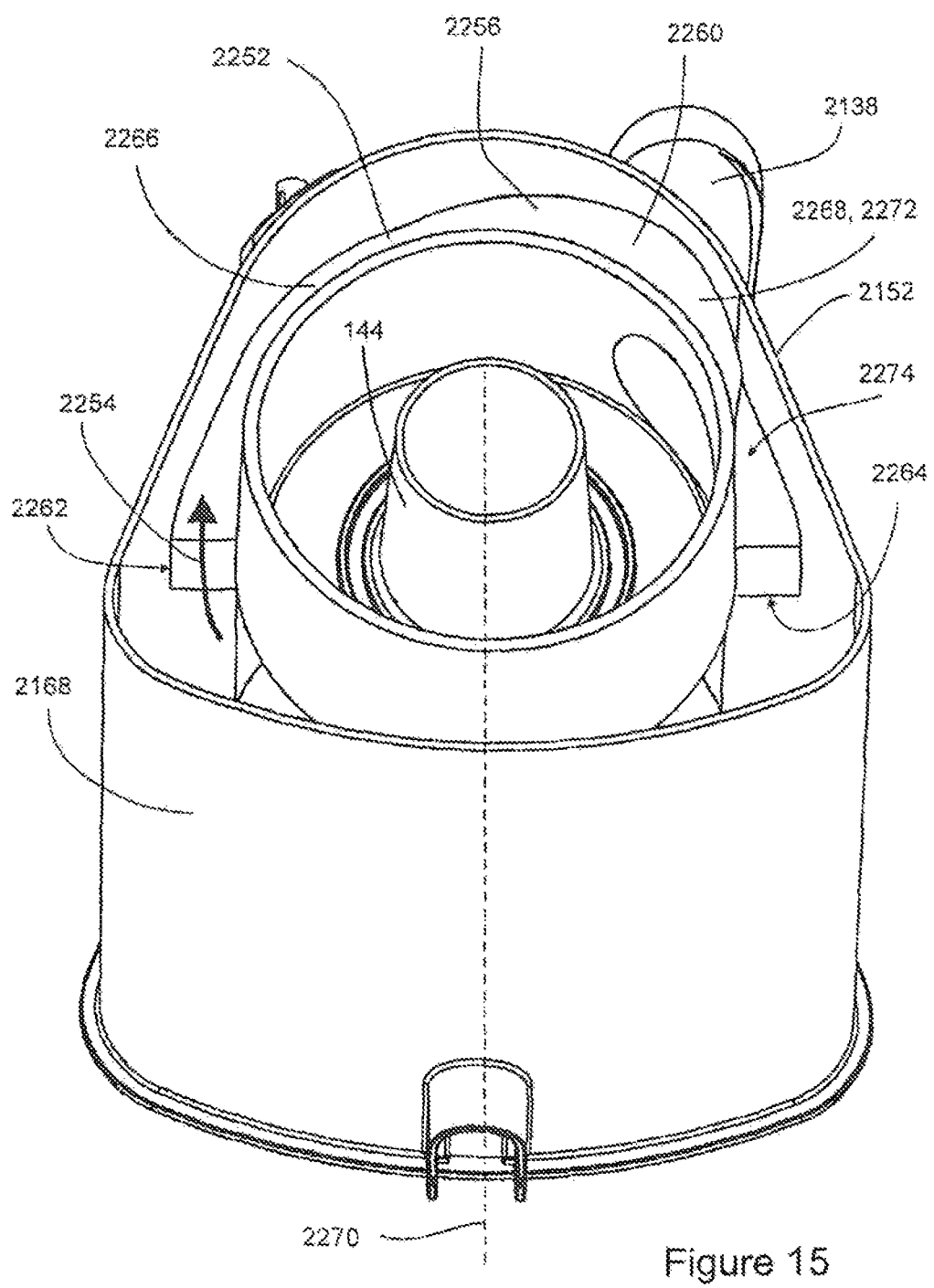
FIG. 15 is a perspective sectional view taken along line 15-15 in FIG. 14.
Figure 16:
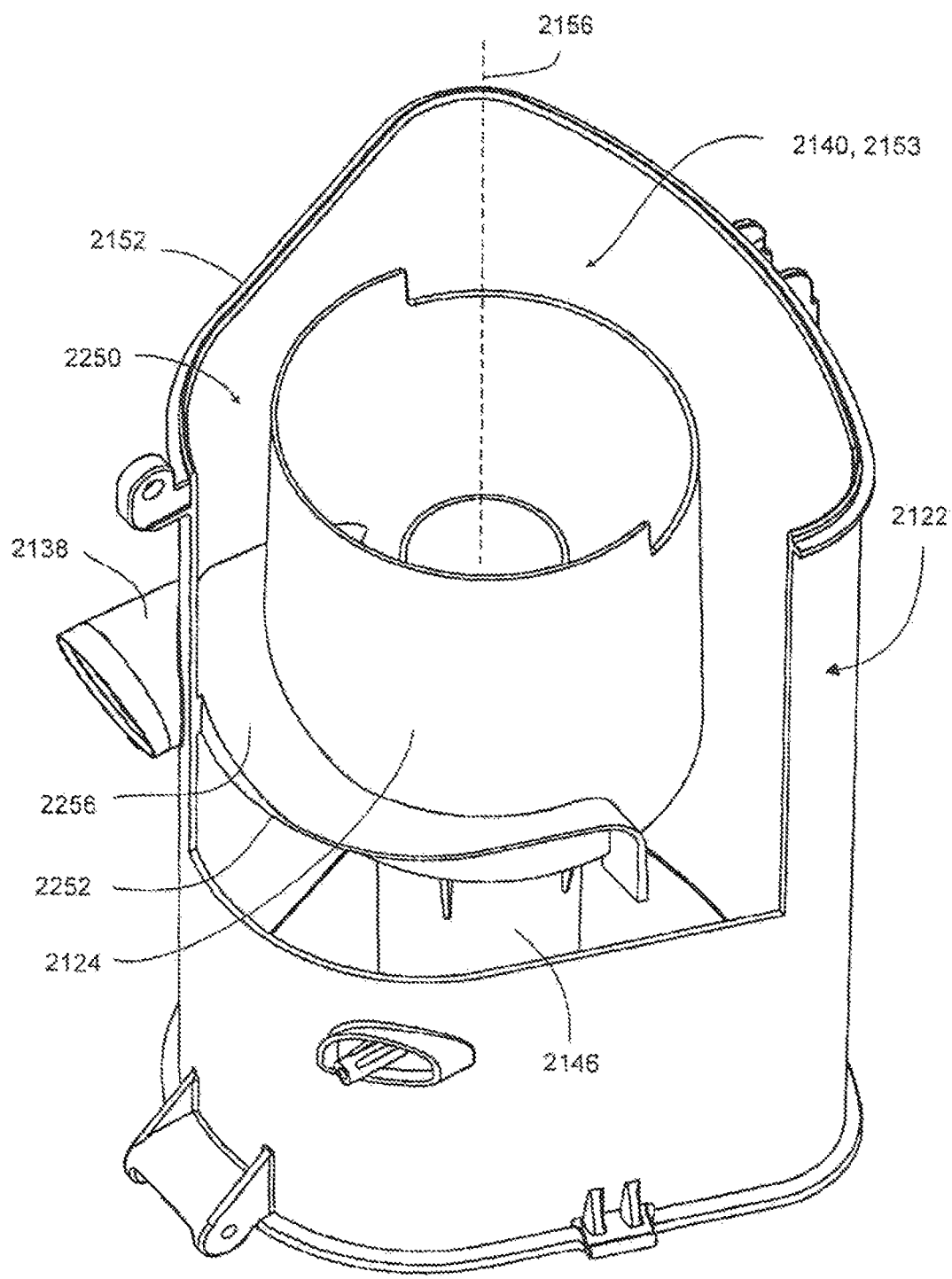
FIG. 16 is a partial cut away view of the cyclone bin assembly of FIG. 14.

As exemplified in FIGS. 13 and 14, the upper section 2104 comprises an air treatment housing 2112 and a suction motor housing 2114. The air treatment housing 2112 houses an air treatment member comprising at least one cyclone chamber and at least one dirt collection chamber, which is positioned in the air flow passage downstream from the dirty air inlet 2108 to remove dirt particles and other debris from the air flowing through the air flow passage. In the illustrated example, the air treatment member comprises a cyclone bin assembly 2118 comprising a cyclone chamber 2120 and a dirt collection chamber 2122. The suction motor housing 2114 is configured to house a suction motor (not shown). The suction motor is in air flow communication with the air flow passage, preferably downstream from the cyclone bin assembly 2118.

In the illustrated example, the cyclone bin assembly 2118 is oriented vertically and the cyclone dirt outlet 2140 is provided at the upper end of the cyclone chamber 2120. It will be appreciated that the cyclone bin assembly may be in other orientations when mounted to a surface cleaning apparatus and when in use.

The cyclone chamber 2120 is bounded by a sidewall 2126, a first (e.g., upper) end wall 2126 and a second end wall 2128, (e.g., a floor). Preferably, as exemplified in FIGS. 14-16, the cyclone chamber 2120 is an inverted cyclone chamber. Accordingly, the dirt outlet 2140 is provided above the cyclone air inlet Preferably, as exemplified, the dirt outlet end of the cyclone chamber 2120 is openable. Accordingly, a lid 2130 may cover the top of the cyclone chamber 2120, and an inner surface of the lid 2130 may comprise the first end wall 2126 of the cyclone chamber 2120. Preferably, the lid 2130 is openable. Opening the lid 2130 may allow a user to access the interior of the cyclone chamber 2120, for example for cleaning. In the illustrated example, the lid 2130 is pivotally connected to the cyclone bin assembly 2118 by a hinge 2132, and is movable between a closed configuration and an open configuration. The lid 2130 may be held in the closed position by any suitable mechanism, including, for example a releasable latch 2134. A handle 2136 is provided on the lid 2128. The handle 2136 may be used to manipulate the cyclone bin assembly 2118 when it is detached from the upper section 2104. Other methods of moveably mounting or removably mounting the lid 2128 may be used.

Preferably, the cyclone air inlet comprises a tangential air inlet. Preferably, as exemplified, tangential air inlet 2138 is provided in the sidewall 2124 of the cyclone chamber 2120 and is in fluid communication with the dirty air inlet 2108. Air flowing into the cyclone chamber via the air inlet may circulate around the interior of the cyclone chamber 2120 and dirt particles and other debris may become disentrained from the circulating air.

Preferably, the dirt outlet 2140 comprises a gap provided between the sidewall 2124 of the cyclone chamber and first (upper) end wall 2126. The gap may extend part way or all the way around sidewall 2124. Preferably, as exemplified, the dirt outlet comprises a slot that extends part way around sidewall 122 between the end of sidewall 124 facing first end wall 2126 and first end wall 2126. Debris separated from the air flow in the cyclone chamber 2120 may travel from the cyclone chamber 2120, through the dirt outlet 2140 to the dirt collection chamber 2122.

Air may exit the cyclone chamber via an air outlet 2142. In the exemplified embodiment, the cyclone chamber 2120 is inverted and the dirt collection chamber includes a portion spaced from and facing the air outlet end of the cyclone chamber. Accordingly, the air exit conduit extends at least part way through the dirt collection chamber. For example, reference may be made to FIG. 14 and FIG. 16 in which the lower portion 2168 of the dirt collection chamber 2122 positioned beneath the cyclone chamber 2120 has been removed. In this example, the cyclone air outlet includes a vortex finder 2144 extending into the cyclone chamber 2120. Optionally, a screen may be positioned over the vortex finder. Optionally, the screen and vortex finder 2144 may be removable.

A down duct 2144 extends from the vortex finder linearly through the lower portion 2168 of the dirt collection chamber 122. The down duct 2146 comprises a generally cylindrical duct member and may extend in any direction through the interior of the dirt collection chamber 2122. Optionally, the down duct 2146 may be detachable from the second end wall 2128.

The cyclone chamber 120 extends along a longitudinal cyclone axis 2156. In the example illustrated, the longitudinal cyclone axis 2156 is aligned with the orientation of the vortex finder 2144.

The dirt collection chamber 2122 comprises a sidewall 2152, a first (upper) end wall 150 and an opposing second end wall, or floor 2154. The first end walls of the cyclone chamber and the dirt collection chamber may be configured to be openable concurrently, e.g., they may be integrally formed. Alternately, or in addition, the second end walls of the cyclone chamber and the dirt collection chamber may be configured to be openable concurrently, e.g., they may be integrally formed with each other.

Referring to FIG. 13, the floor 2154 of the dirt collection chamber 2122 is openable. Opening the dirt collection chamber floor 2154 may help facilitate emptying dirt and other debris from the dirt collection chamber 2122. In the example illustrated, the dirt collection chamber floor 2154 is pivotally connected to the dirt collection chamber sidewall 2152 by a hinge, and is pivotable between and open position and a closed position. The dirt collection floor 2154 also comprises an air outlet aperture that allows air from the down duct to pass through the floor 2154. Optionally, sealing gaskets, or other sealing members, may be provided around the perimeter of the floor 2154 and around the air outlet aperture, to help seal the dirt collection chamber 2122 when the floor 2154 is closed.

As exemplified, the dirt collection chamber 2122 has a portion adjacent the cyclone dirt outlet 2140 that is preferably annular in shape (e.g., the upper annular portion) and a second spaced apart portion extending across the outer surface of the air exit end of the cyclone chamber (lower portion 2168). Preferably, the portions are contiguous.

The dirt collection chamber 2122 has a dirt collection chamber dirt inlet 2153 that is in communication with the cyclone dirt outlet 2140. Preferably, the dirt inlet 2153 is the dirt outlet 2240 of the cyclone chamber 2120.

In the illustrated example, the cyclone chamber 2120 is nested towards the rear of the dirt collection chamber 2122 (relative to the direction of travel of the surface cleaning apparatus 2100), and a generally annular space 2250 is defined between the cyclone chamber sidewall 2124 and the dirt collection chamber sidewall 2152. The annular space 2250 may have a constant width or the width may vary. Further, the annular space may surround the entire height of the cyclone chamber 2120 or any part or portion thereof. In other configurations, the space 2250 may have any other suitable shape and need not be curved or annular.

A support member, for example a support surface, may be provided to help support the cyclone chamber 2120 within the cyclone bin assembly. The support member may be any suitable combination of structural members that are configured to help connect the cyclone chamber to the dirt collection chamber, and hold the relative spacing between these chambers while the surface cleaning apparatus is in use.

In the illustrated example, the support surface comprises a connecting wall 2252 that is provided in the annular space 2250 between the cyclone chamber sidewall 2124 and the dirt collection chamber sidewall 2152, rearward of the cyclone chamber 2120. Connecting wall 2252 surrounds a portion of the cyclone chamber 2120, and in the illustrated example surrounds approximately 50% of the cyclone chamber 2120. In other examples the connecting wall 2252 may surround more than or less than 50% of the cyclone chamber 2120.

When the surface cleaning apparatus is in use, a portion of the dirty air in the cyclone chamber 2120 may flow out of the dirt outlet 2140 and circulate within the dirt collection chamber 2122 in a rotation direction, as illustrated using arrows 2254. A portion of this air may flow through the annular space 2250 behind the cyclone chamber 2120. Dirt particles entrained with the air circulating through annular space 2250 may become disentrained from the air flow and may settle on the upper surface 2256 of the connecting wall 2252.

In accordance with this aspect of the disclosure, the connecting wall 2252 is preferably configured to help shed the dirt particles that settle on the connecting wall 2252, and to urge the dirt particles toward the lower portion 2168 of the dirt collection chamber 2122. Guiding the dirt particles toward the lower portion 2168 of the dirt collection chamber 2122 may help facilitate the collection of dirt and debris in the lower portion 2168 of the dirt collection chamber 2122, which may help facilitate emptying of the dirt collection chamber 2122. It may also help prevent dirt particles from being retained on the upper surface 2256 of the connecting wall 2252. Preferably, the connecting wall 2252 does not comprise horizontal surfaces that may retain dirt particles when the surface cleaning apparatus 2100 is in an upright position (for example see FIG. 13).

The connecting wall 2252 may be of any suitable shape and configuration, and may include any suitable combination of features to help inhibit the accumulation of dirt and debris on the connecting wall 2252. In the illustrated example, the connecting wall 2252 has a high point 2260 adjacent the tangential air inlet 2138 that is at a higher elevation than the first and second ends 2262, 2264, thereby forming first and second ramp surfaces 2266, 2268. In this configuration, the high point 2260 of the connecting wall is intermediate the first and second ends 2262 and 2264, and is offset relative to a lateral centre line 2270 cyclone chamber. Alternatively, the high point 2260 of the connecting wall 2252 may be aligned with the centre line 2270.

First and second ramp surfaces 2266, 2268 slope generally downwardly from the high point 2260 toward the first and second ends 2262, 2264, respectively. In this configuration, the first and second ends 2262, 2264 are positioned at the points of lowest elevation on the connecting wall 2252. Providing inclined ramp surfaces 2266, 2268 may help urge dirt particles settling on the ramp surfaces 2266, 2268 to move toward the corresponding ends 2262, 2264 of the connecting wall 2252, and fall into lower portion of the dirt collection chamber 2122. The slope of the ramp surfaces 2266 and 2268 may be constant along their lengths, or may vary.

The first ramp surface 2266 is preferably a generally smooth surface extending from the high point 2260 to the first end 2262. The second ramp surface 2268 may comprise a portion of the tangential air inlet sidewall 2272 and comprises a kinked region 2274 where the air inlet sidewall 2272 joins with the connecting wall 2252. Providing a kinked region 2274, or other type of discontinuity in the ramp surface 2268, may introduce eddy currents or other flow disturbances in the dirty air flow circulating within the annular space 2250. Introducing disturbances in the air flow may help disentrain dirt particles from the air flow. Other surface features may also be provided on the ramp surfaces 2266 and 2268.

Optionally, instead of positioning the high point 2260 of the connection wall intermediate the first and second ends 2262 and 2264, the high point 2260 may be positioned at one of the ends 2262, 2264 of the connecting wall 2252. For example, the connecting wall 2252 may be configured so that the first end 2262 is the point of highest elevation 2260 and the second end 2264 is the point of lowest elevation, so that the connecting wall 2252 may slope generally downward from the first end 2262 to the second end 2264, or vice versa. Preferably, at least one of the ends 2262, 2264 of the connecting wall is positioned at the point of lowest elevation of the connecting wall 2252. Positioning at least one of the ends 2262, 2264 at the point of lowest elevation may help prevent low points or recesses along the length of the connecting wall 2252, which may trap dirt particles, from being formed between the high point 2260 and the ends 2262, 2264 of the connecting wall.

The ramp surface may be sloped or declined at an angle between about 5 degrees to about 80° relative to a plane that is perpendicular to the cyclone axis 2156 (for example a horizontal plane), preferably between about 5° and about 50° and more preferably between about 15° and about 35°. The slope of the ramped surfaces 2266, 2268 is preferably generally constant along their length. However, the slope of the ramped surfaces 2266, 2268 may vary along the lengths of the surfaces 2266, 2268, so that a given ramped surface 2266 or 2268 may comprise relatively steeper and relatively flatter portions.

In the example illustrated, a portion of the connecting wall 2252 is integral with the tangential air inlet sidewall 2272. Accordingly, it will be appreciated that the connecting wall may form, e.g., an upper surface of the cyclone air inlet. Alternatively, the tangential air inlet sidewall 2272 may be separate from the connecting wall 2252 and/or may not pass through the dirt collection chamber 2120.

It will be appreciated that the following claims are not limited to any specific embodiment disclosed herein. Further, it will be appreciated that any one or more of the features disclosed herein may be used in any particular combination or sub-combination, including, without limitation, a dirt collection chamber with a variable diameter or cross sectional area, the fine particle separator, an annular dirt collection chamber with a rib or baffle, reinforcing ribs for a cyclone chamber floor, a down flow duct and a recess in the outer sidewall of the dirt collection chamber and/or a connecting wall.

What has been described above has been intended to be illustrative of the invention and non-limiting and it will be understood by persons skilled in the art that other variants and modifications may be made without departing from the scope of the invention as defined in the claims appended hereto.

The invention claimed is:

1. An upright surface cleaning apparatus comprising:
   a) a surface cleaning head having a dirty air inlet;
   b) an upper section moveably mounted to the surface cleaning head between a storage position and an in use position;
   c) an airflow passage extending from the dirty air inlet to a clean air outlet and including a suction motor;
   d) the upper section having an air treatment housing, wherein when the upper section is in the storage position, the air treatment housing has an upper end and an lower end, the upper end comprises an openable lid and the lower end comprises an openable lower end wall, the air treatment housing comprising a cyclone chamber and a dirt collection chamber that is below the cyclone chamber when the upper section is in the storage position;
   e) the cyclone chamber including an upper cyclone end, a lower cyclone end spaced apart from the upper cyclone end in an axial direction and a cyclone sidewall extending between the upper and lower cyclone ends, the cyclone chamber comprising a dirt outlet, a cyclone air inlet and a cyclone air outlet, the dirt outlet comprising a slot provided in the cyclone sidewall wherein the cyclone sidewall has a first portion having a first axial length at the location of the dirt outlet that is shorter than an axial length of a second portion of the cyclone sidewall that is adjacent the dirt outlet;
   f) the dirt collection chamber comprising a radial outer wall that has a larger diameter than the diameter of the cyclone sidewall; and,
   g) a transition wall, wherein when the upper section is in the storage position the transition wall has an upper end and a lower end, the upper end of the transition wall is provided on the cyclone sidewall at a location between the upper cyclone end and the lower cyclone end, and the lower end of the transition wall extends to an upper end of the radial outer wall of the dirt collection chamber whereby the transition wall directly connects the cyclone sidewall to the radial outer wall of the dirt collection chamber.

2. The surface cleaning apparatus of claim 1, wherein the lower end wall has a cross sectional area in a direction transverse to the axial direction that is larger than a cross sectional area of the lid in the transverse direction.

3. The surface cleaning apparatus of claim 1, wherein when the lower end wall is in an open position, the dirt collection chamber is opened.

4. The surface cleaning apparatus of claim 3, wherein when the lid is in an open position, the cyclone chamber is opened.

5. The surface cleaning apparatus of claim 4, wherein the dirt outlet is at an opposed end of the cyclone chamber from an end of the cyclone chamber having the air inlet of the cyclone chamber and the air outlet of the cyclone chamber.

6. The surface cleaning apparatus of claim 1, wherein the air treatment housing is removably mounted to the upper section.

7. The surface cleaning apparatus of claim 1, wherein the transition wall is an outer wall of the air treatment housing.

8. The surface cleaning apparatus of claim 1, wherein the radial outer wall of the dirt collection chamber is an outer wall of the air treatment housing.

9. The surface cleaning apparatus of claim 1, wherein a portion of the cyclone sidewall, which is located above the transition wall when the upper section is in the storage position, is an outer wall of the air treatment housing.

10. The surface cleaning apparatus of claim 8, wherein the transition wall is an outer wall of the air treatment housing.

11. The surface cleaning apparatus of claim 10, wherein a portion of the cyclone sidewall, which is located above the transition wall when the upper section is in the storage position, is an outer wall of the air treatment housing.

12. The surface cleaning apparatus of claim 1, wherein when the lid and the lower end wall are each in an open position, an opening is provided that extends from the upper end of the air treatment housing to the lower end of the air treatment housing.

* * * * *